US012659967B2

(12) United States Patent 
Moon et al.

(10) Patent No.: US 12,659,967 B2 
(45) Date of Patent: Jun. 16, 2026

(54) ADAPTIVE CONTROL CHANNEL MONITORING METHOD FOR LOW-POWER OPERATION OF TERMINAL, AND APPARATUS THEREFOR

(71) Applicant: ELECTRONICS AND TELECOMMUNICATIONS RESEARCH INSTITUTE, Daejeon (KR)

(72) Inventors: Sung Hyun Moon, Daejeon (KR); Cheul Soon Kim, Daejeon (KR); Jung Hoon Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 542 days.

(21) Appl. No.: 18/246,092

(22) PCT Filed: Sep. 23, 2021

(86) PCT No.: PCT/KR2021/012950 
§ 371 (c)(1), 
(2) Date: Mar. 21, 2023

(87) PCT Pub. No.: WO2022/071688 
PCT Pub. Date: Apr. 7, 2022

(65) Prior Publication Data 
US 2023/0362954 A1 Nov. 9, 2023

(30) Foreign Application Priority Data

Sep. 29, 2020 (KR) ........................ 10-2020-0127240 
Jan. 21, 2021 (KR) ........................ 10-2021-0008854 
(Continued)

(51) Int. Cl. 
*H04W 72/232* (2023.01) 
*H04L 1/1829* (2023.01) 
(Continued)

(52) U.S. Cl. 
CPC ......... *H04W 72/232* (2023.01); *H04L 1/1854* (2013.01); *H04L 5/0055* (2013.01); *H04W 72/0446* (2013.01)

(58) Field of Classification Search 
CPC ............ H04W 72/232; H04W 72/0446; H04L 1/1854; H04L 5/0055 
See application file for complete search history.

(56) References Cited

U.S. PATENT DOCUMENTS

2020/0187236 A1 6/2020 Moon et al. 
2020/0195410 A1 6/2020 Li et al. 
(Continued)

FOREIGN PATENT DOCUMENTS

CA 3077014 A1 9/2020 
EP 3952481 A1 2/2022 
(Continued)

OTHER PUBLICATIONS

Apple Inc., "Remaining issues of DL signals and channels", R1-2002320, 3GPP TSG RAN WG1 #100b, Apr. 11, 2020. 
(Continued)

*Primary Examiner* — Edan Orgad 
(74) *Attorney, Agent, or Firm* — Rabin & Berdo, P.C.

(57) ABSTRACT

A method for operation of a terminal for monitoring a downlink control channel comprises the steps of: receiving configuration information of a first SSSG and a second SSSG from a base station; monitoring the first SSSG in a first period; and monitoring the second SSSG in a second period. DCI including an indication for switching a target to be monitored from the first SSSG to the second SSSG in a period before the second period may be received from the base station.

19 Claims, 8 Drawing Sheets

(30) Foreign Application Priority Data

| Aug. 6, 2021 | (KR) | .......................... 10-2021-0103877 |
| Sep. 23, 2021 | (KR) | .......................... 10-2021-0125444 |

(51) Int. Cl.

| *H04L 5/00* | (2006.01) |
| *H04W 72/0446* | (2023.01) |

(56) References Cited

U.S. PATENT DOCUMENTS

| 2020/0221428 | A1 | 7/2020 | Moon et al. | |
| 2020/0314898 | A1 | 10/2020 | Sun et al. | |
| 2020/0351786 | A1 | 11/2020 | Koskela et al. | |
| 2020/0367080 | A1 | 11/2020 | Salah et al. | |
| 2020/0389874 | A1 | 12/2020 | Lin et al. | |
| 2022/0377585 | A1* | 11/2022 | Chen | ..................... H04W 72/23 |
| 2023/0164807 | A1* | 5/2023 | Lee | ......................... H04W 4/06 |
| | | | | 370/329 |
| 2023/0269742 | A1* | 8/2023 | Kuang | .............. H04W 72/1263 |
| | | | | 370/329 |
| 2024/0430906 | A1* | 12/2024 | Elshafie | ................ H04L 5/0094 |
| 2025/0126622 | A1* | 4/2025 | Ma | ........................ H04L 5/0053 |

FOREIGN PATENT DOCUMENTS

| WO | 2020102146 | A2 | 5/2020 | |
| WO | WO-2020246858 | A1 * | 12/2020 | ............ H04W 72/23 |

OTHER PUBLICATIONS

Ericsson, "DL signals and channels for NR-U", R1-1912707, 3GPP TSG RAN WG1 #98b, Reno, USA, Nov. 9, 2019.

Ericsson, "UE power saving using search space set switching", R1-2004360, 3GPP TSG RAN WG1 #101-e, May 16, 2020.

LG Electronics, "Remaining issues of DL signals and channels for NR-U", R1-2004011, 3GPP TSG RAN WG1 #101, May 16, 2020.

Motorola Mobility et al., "Feature lead summary #3 for NR-U DL Signals and Channels", R1-1913501, 3GPP TSG RAN WG1 #99, Reno, USA, Nov. 25, 2019.

Source: Ericsson, "UE power saving using search space set switching", Agenda item: 7.2.7.4, R1-2004360, 3GPP TSG RAN WG1 #101-e, e-Meeting, May 25-Jun. 5, 2020.

Source: Nokia, Nokia Shanghai Bell, "UE power saving enhancements for Active Time", Agenda Item: 8.7.2, R1-2006898, 3GPP TSG RAN WG1 #102-e, e-Meeting, August 17-Aug. 28, 2020.

Source: Qualcomm Incorporated, "Potential Extension(s) to Rei-16 DCI-based power saving adaptation during DRX Active Time", Agenda Item: 8.7.2, R1-2006817, 3GPP TSG RAN WG1 #102-e, e-Meeting, August 17-Aug. 28, 2020.

* cited by examiner

ADAPTIVE CONTROL CHANNEL MONITORING METHOD FOR LOW-POWER OPERATION OF TERMINAL, AND APPARATUS THEREFOR

TECHNICAL FIELD

The present disclosure relates to a technique for reducing power consumption of a terminal in a mobile communication system, and more particularly, to a method of adaptively monitoring control channels for reduction of power consumption of a terminal, and an apparatus therefor.

BACKGROUND ART

With the development of information and communication technologies, various wireless communication technologies are being developed. Representative wireless communication technologies include long term evolution (LTE), new radio (NR), or the like defined as the 3rd generation partnership project (3GPP) specifications. The LTE may be one of 4th generation (4G) wireless communication technologies, and the NR may be one of 5th generation (5G) wireless communication technologies.

The communication system (e.g., a new radio (NR) communication system) using a higher frequency band (e.g., a frequency band of 6 GHz or above) than a frequency band (e.g., a frequency band of 6 GHz or below) of the long term evolution (LTE) communication system (or, LTE-A communication system) is being considered for processing of soaring wireless data. The 5G communication system may support enhanced Mobile BroadBand (eMBB), Ultra Reliable Low Latency Communication (URLLC), and Massive Machine Type Communication (mMTC).

Accordingly, in order to achieve various communication performance indicators, a processing power of a communication node is being greatly increased, but there is a problem in that a power consumption of the communication node also increases. In particular, in case of a terminal, since a power is supplied by a battery, the rapid power consumption of the terminal may reduce a user's sensible satisfaction or limit the field of application of the communication system. Therefore, it is required to improve a signal transmission method for supporting the low-power operation of the terminal.

DISCLOSURE

Technical Problem

The present disclosure is directed to providing an operation method of a terminal for adaptively monitoring downlink control channels.

The present disclosure is directed to providing a configuration of the terminal for adaptively monitoring downlink control channels.

Technical Solution

According to an exemplary embodiment of the present disclosure for achieving the objective, an operation method of a terminal for monitoring a physical downlink control channel (PDCCH) may comprise: receiving, from a base station, configuration information of a first search space set group (SSSG) and a second SSSG; performing monitoring on the first SSSG in a first period; and performing monitoring on the second SSSG in a second period, wherein downlink control information (DCI) including an indication for switching a monitoring target from the first SSSG to the second SSSG is received from the base station in a period before the second period.

Each of the first SSSG and the second SSSG may include search space set(s) to be monitored, and the search space set(s) may be associated with a same control resource set (CORESET) or different CORESETs.

The first SSSG and the second SSSG may be monitored in a same active time of a discontinuous reception (DRX) cycle.

The first SSSG may be a starting SSSG for the DRX cycle, and the starting SSSG may be a default SSSG configured by the base station, an SSSG monitored last in a previous DRX cycle of the DRX cycle, or an SSSG indicated last to be monitored in the previous DRX cycle.

The DCI including the indication for switching the monitoring target from the first SSSG to the second SSSG may be received in an active time of a DRX cycle or in a period outside an active time of a DRX cycle.

When the DCI is received in an active time of a DRX cycle or in a period outside an active time of a DRX cycle, the DCI may have a DCI format 2_6, and a time when the DCI is received may be preconfigured between the base station and the terminal.

The monitoring on the first SSSG and the second SSSG may be performed regardless of a DRX cycle configured to the terminal.

The second period may end when a timer initialized when the monitoring target is switched from the first SSSG to the second SSSG expires, and if a PDCCH is received through the second SSSG while the timer is running, the timer may be re-initialized.

The operation method may further comprise: receiving, from the base station, information indicating skipping PDCCH monitoring on a third SSSG during a third period from the base station; and skipping monitoring on the third SSSG during the third period.

The third SSSG may include search space set(s) on which skipping of PDCCH monitoring is indicated, and information on the third SSSG may be defined in a technical specification or indicated by the base station.

The first SSSG may have a larger number of PDCCH candidates and/or a shorter PDCCH monitoring periodicity than the second SSSG, and the second SSSG may have a smaller number of PDCCH candidates and/or a longer PDCCH monitoring periodicity than the first SSSG.

According to another exemplary embodiment of the present disclosure for achieving the objective, an operation method of a terminal for monitoring a physical downlink control channel (PDCCH) may comprise: obtaining information on a first search space set group (SSSG); receiving, from a base station, downlink control information (DCI) including an indication of skipping PDCCH monitoring on the first SSSG during a first skipping period; and skipping monitoring on the first SSSG during the first skipping period.

The first SSSG may include search space set(s) on which skipping of PDCCH monitoring is indicated, and information on the first SSSG may be defined in a technical specification or indicated by the base station.

A timer may be started when entering the first skipping period, and the first skipping period may end when the timer expires.

When the first skipping period ends, an operation of monitoring a default SSSG may be performed.

A timer for a second SSSG monitored before the first skipping period may be paused when entering the first skipping period, the timer for the second SSSG may be resumed when the first skipping period ends, and an operation of monitoring the second SSSG may start when the first skipping period ends.

A timer of a third SSSG monitored before entering the first skipping period may continue to operate in the first skipped period; if the timer of the third SSSG expires when the first skipping period ends, the terminal may switch a monitoring target to a default SSSG; and if the timer of the third SSSG does not expire when the first skipping period ends, the terminal may perform monitoring on the third SSSG.

The operation method may further comprise: obtaining information on a fourth SSSG; receiving, from the base station, information indicating skipping PDCCH monitoring on the fourth SSSG during a second skipping period; and skipping monitoring on the fourth SSSG during the second skipping period, wherein the first skipping period and the second skipping period are different from each other, or overlap at least partially.

According to yet another exemplary embodiment of the present disclosure for achieving the objective, a terminal for monitoring a physical downlink control channel (PDCCH) may comprise: a processor; and a memory storing at least one instruction executable by the processor, wherein the at least one instruction causes the terminal to: receive, from a base station, configuration information of a first search space set group (SSSG), a second SSSG, and a third SSSG; perform monitoring on the first SSSG in a first period; perform monitoring on the second SSSG in a second period; and receive, from the base station, information indicating skipping of monitoring on a PDCCH of the third SSSG during a third period, and skip monitoring on the third SSSG during the third period.

Each of the first SSSG and the second SSSG may include search space set(s) to be monitored, the search space set(s) may be associated with a same control resource set (CORE-SET) or different CORESETs, the third SSSG may include search space set(s) on which skipping of PDCCH monitoring is indicated, and information on the first SSSG may be defined in a technical specification or indicated by the base station.

Advantageous Effects

According to exemplary embodiments of the present disclosure, an adaptive downlink control channel (e.g., PDCCH) monitoring method for a low-power operation of a terminal may be provided. Accordingly, it is made possible to reduce power consumption of the terminal in the wireless communication system.

BEST MODE OF THE INVENTION

Figure 1:
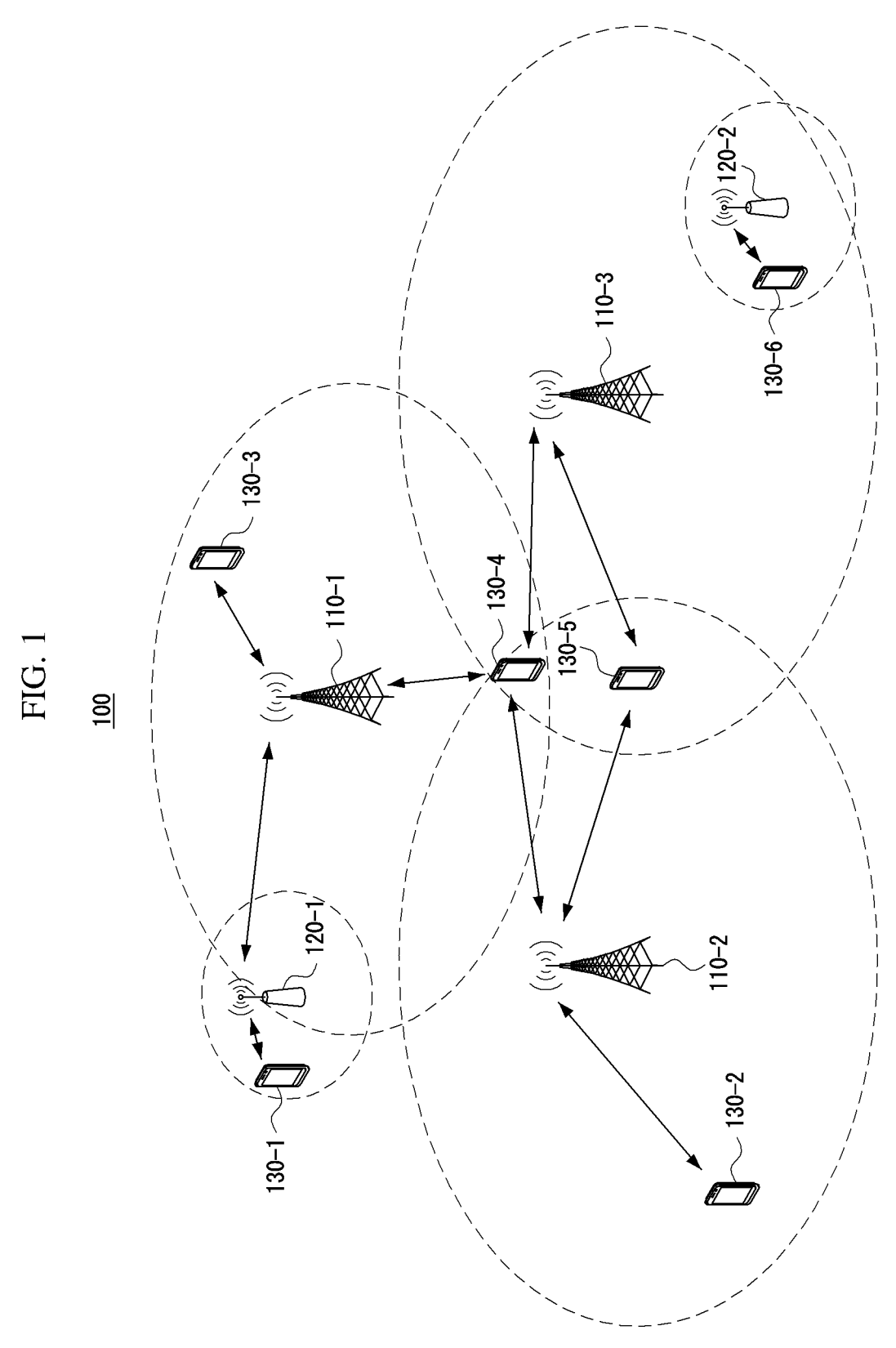
FIG. 1 is a conceptual diagram illustrating a first exemplary embodiment of a communication system.

Since the present disclosure may be variously modified and have several forms, specific exemplary embodiments will be shown in the accompanying drawings and be described in detail in the detailed description. It should be understood, however, that it is not intended to limit the present disclosure to the specific exemplary embodiments but, on the contrary, the present disclosure is to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without departing from the scope of the present disclosure, and the second component may also be similarly named the first component. The term "and/or" means any one or a combination of a plurality of related and described items.

When it is mentioned that a certain component is "coupled with" or "connected with" another component, it should be understood that the certain component is directly "coupled with" or "connected with" to the other component or a further component may be disposed therebetween. In contrast, when it is mentioned that a certain component is "directly coupled with" or "directly connected with" another component, it will be understood that a further component is not disposed therebetween.

The terms used in the present disclosure are only used to describe specific exemplary embodiments, and are not intended to limit the present disclosure. The singular expression includes the plural expression unless the context clearly dictates otherwise. In the present disclosure, terms such as 'comprise' or 'have' are intended to designate that a feature, number, step, operation, component, part, or combination thereof described in the specification exists, but it should be understood that the terms do not preclude existence or addition of one or more features, numbers, steps, operations, components, parts, or combinations thereof.

Unless otherwise defined, all terms (including technical and scientific terms) used herein have the same meaning as commonly understood by one of ordinary skill in the art to which this disclosure belongs. Terms that are generally used and have been in dictionaries should be construed as having meanings matched with contextual meanings in the art. In this description, unless defined clearly, terms are not necessarily construed as having formal meanings.

Hereinafter, forms of the present disclosure will be described in detail with reference to the accompanying drawings. In describing the disclosure, to facilitate the entire understanding of the disclosure, like numbers refer to like elements throughout the description of the figures and the repetitive description thereof will be omitted.

A wireless communication network to which exemplary embodiments according to the present disclosure are applied will be described. The wireless communication network to which the exemplary embodiments according to the present disclosure are applied is not limited to the contents described below, and the exemplary embodiments according to the present disclosure may be applied to various wireless communication networks. Here, the term 'communication system' may be used in the same sense as a 'communication network'.

FIG. 1 is a conceptual diagram illustrating a first exemplary embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. In addition, the communication system 100 may further comprise a core network (e.g., a serving gateway (S-GW), a packet data network (PDN) gateway (P-GW), and a mobility management entity (MME)). When the communication system 100 is a 5G communication system (e.g., New Radio (NR) system), the core network may include an access and mobility management function (AMF), a user plane function (UPF), a session management function (SMF), and the like.

The plurality of communication nodes 110 to 130 may support communication protocols defined in the 3rd generation partnership project (3GPP) technical specifications (e.g., LTE communication protocol, LTE-A communication protocol, NR communication protocol, or the like). The plurality of communication nodes 110 to 130 may support code division multiple access (CDMA) based communication protocol, wideband CDMA (WCDMA) based communication protocol, time division multiple access (TDMA) based communication protocol, frequency division multiple access (FDMA) based communication protocol, orthogonal frequency division multiplexing (OFDM) based communication protocol, filtered OFDM based communication protocol, cyclic prefix OFDM (CP-OFDM) based communication protocol, discrete Fourier transform-spread-OFDM (DFT-s-OFDM) based communication protocol, orthogonal frequency division multiple access (OFDMA) based communication protocol, single carrier FDMA (SC-FDMA) based communication protocol, non-orthogonal multiple access (NOMA) based communication protocol, generalized frequency division multiplexing (GFDM) based communication protocol, filter band multi-carrier (FBMC) based communication protocol, universal filtered multi-carrier (UFMC) based communication protocol, space division multiple access (SDMA) based communication protocol, or the like. Each of the plurality of communication nodes may have the following structure.

Figure 2:
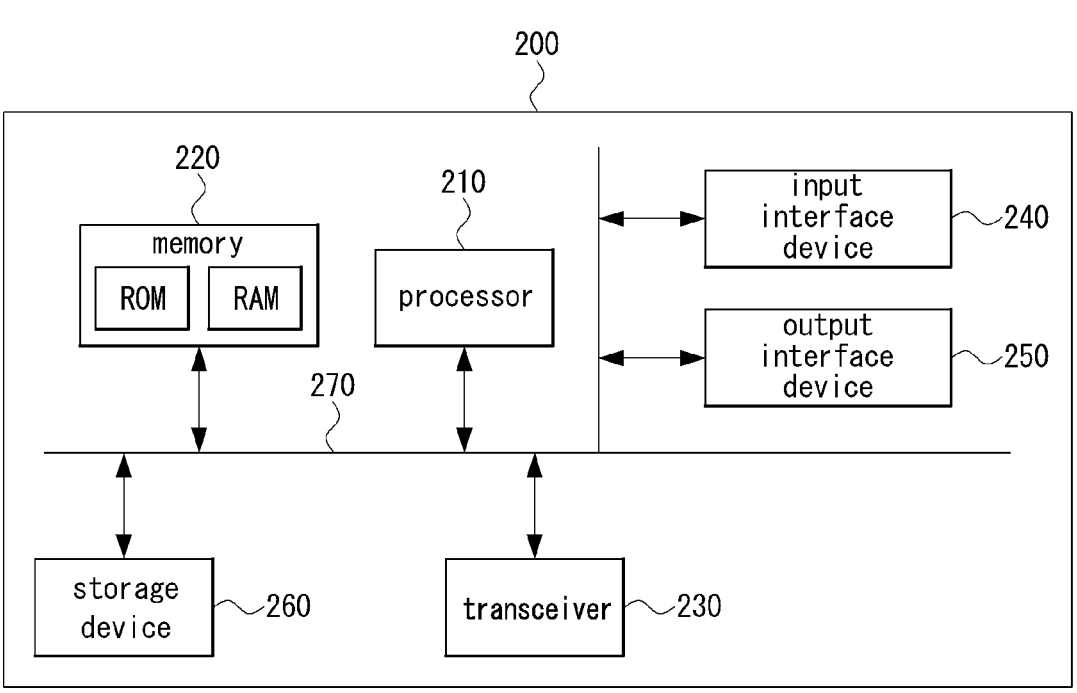
FIG. 2 is a block diagram illustrating a first exemplary embodiment of a communication node constituting a communication system.

FIG. 2 is a block diagram illustrating a first exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

However, each of the components included in the communication node 200 may not be connected to the processor 210 not through the common bus 270 but through an individual interface or an individual bus. For example, the processor 210 may be connected to at least one of the memory 220, the transceiver 230, the input interface device 240, the output interface device 250, and the storage device 260 through a dedicated interface(s).

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

The present disclosure relates to a method of transmitting and receiving a signal in a communication system, and more particularly, to a method of transmitting a downlink control channel for reducing power consumption of a terminal in a wireless communication system. Exemplary embodiments below may be applied to not only the NR communication system but also other communication systems (e.g., LTE communication system, 5G communication system, sixth generation (6G) communication system, and the like).

The NR communication system may support a wider system bandwidth (e.g., carrier bandwidth) than a system bandwidth provided by the LTE communication system in order to efficiently use a wide frequency band. For example, the maximum system bandwidth supported by the LTE communication system may be 20 MHz. On the other hand, the NR communication system may support a carrier bandwidth of up to 100 MHz in a frequency band of 6 GHz or below, and may support a carrier bandwidth of up to 400 MHz in a frequency band of 6 GHz or above.

A numerology applied to physical signals and channels in the communication system (e.g., NR communication system) may be variable. The numerology may vary to satisfy various technical requirements of the communication system. In the communication system to which a cyclic prefix (CP) based OFDM waveform technology is applied, the numerology may include a subcarrier spacing and a CP length (or CP type). Table 1 below may be a first exemplary embodiment of configuration of numerologies for the CP-based OFDM. Adjacent subcarrier spacings may have an exponential multiplication relationship of 2, and the CP length may be scaled at the same ratio as the OFDM symbol length. Depending on a frequency band in which the communication system operates, at least some numerologies among the numerologies of Table 1 may be supported. In addition, in the communication system, numerologies not listed in Table 1 may be further supported. CP type(s) not listed in Table 1 (e.g., extended CP) may be additionally supported for a specific subcarrier spacing (e.g., 60 kHz).

TABLE 1

| Subcarrier spacing | 15 kHz | 30 kHz | 60 kHz | 120 kHz | 240 kHz | 480 kHz |
|---|---|---|---|---|---|---|
| OFDM symbol length [μs] | 66.7 | 33.3 | 16.7 | 8.3 | 4.2 | 2.1 |

TABLE 1-continued

| Subcarrier spacing | 15 kHz | 30 kHz | 60 kHz | 120 kHz | 240 kHz | 480 kHz |
|---|---|---|---|---|---|---|
| CP length [μs] | 4.76 | 2.38 | 1.19 | 0.60 | 0.30 | 0.15 |
| Number of OFDM symbols within 1 ms | 14 | 28 | 56 | 112 | 224 | 448 |

In the following description, a frame structure in the communication system will be described. In the time domain, elements constituting a frame structure may include a subframe, slot, mini-slot, symbol, and the like. The sub-frame may be used as a unit for transmission, measurement, and the like, and the length of the subframe may have a fixed value (e.g., 1 ms) regardless of a subcarrier spacing. A slot may comprise consecutive symbols (e.g., 14 OFDM sym-bols). The length of the slot may be variable differently from the length of the subframe. For example, the length of the slot may be inversely proportional to the subcarrier spacing.

A slot may be used as a unit for transmission, measure-ment, scheduling, resource configuration, timing (e.g., scheduling timing, hybrid automatic repeat request (HARQ) timing, channel state information (CSI) measurement and reporting timing, etc.), and the like. A length of an actual time resource used for transmission, measurement, sched-uling, resource configuration, etc. may not match the length of a slot. A mini-slot may include consecutive symbol(s), and a length of a mini-slot may be shorter than a length of a slot. A mini-slot may be used as a unit for transmission, measurement, scheduling, resource configuration, timing, and the like. A mini-slot (e.g., the length of a mini-slot, a mini-slot boundary, etc.) may be predefined in the technical specification. Alternatively, a mini-slot (e.g., a length of a mini-slot, a mini-slot boundary, etc.) may be configured (or indicated) to the terminal. When a specific condition is satisfied, use of a mini-slot may be configured (or indicated) to the terminal.

The base station may schedule a data channel (e.g., physical downlink shared channel (PDSCH), physical uplink shared channel (PUSCH), physical sidelink shared channel (PSSCH)) using some or all of symbols constituting a slot. In particular, for URLLC transmission, unlicensed band transmission, transmission in a situation where an NR communication system and an LTE communication system coexist, and multi-user scheduling based on analog beam-forming, a data channel may be transmitted using a portion of a slot. In addition, the base station may schedule a data channel using a plurality of slots. In addition, the base station may schedule a data channel using at least one mini-slot.

In the frequency domain, elements constituting the frame structure may include a resource block (RB), subcarrier, and the like. One RB may include consecutive subcarriers (e.g., 12 subcarriers). The number of subcarriers constituting one RB may be constant regardless of a numerology. In this case, a bandwidth occupied by one RB may be proportional to a subcarrier spacing of a numerology. An RB may be used as a transmission and resource allocation unit for a data chan-nel, control channel, and the like. Resource allocation of a data channel may be performed in units of RBs or RB groups (e.g., resource block group (RBG)). One RBG may include one or more consecutive RBs. Resource allocation of a control channel may be performed in units of control chan-nel elements (CCEs). One CCE in the frequency domain may include one or more RBs.

In the NR communication system, a slot (e.g., slot format) may be composed of a combination of one or more of downlink period, flexible period (or unknown period), and an uplink period. Each of a downlink period, flexible period, and uplink period may be comprised of one or more con-secutive symbols. A flexible period may be located between a downlink period and an uplink period, between a first downlink period and a second downlink period, or between a first uplink period and a second uplink period. When a flexible period is inserted between a downlink period and an uplink period, the flexible period may be used as a guard period.

A slot may include one or more flexible periods. Alter-natively, a slot may not include a flexible period. The terminal may perform a predefined operation in a flexible period. Alternatively, the terminal may perform an operation configured by the base station semi-statically or periodically. For example, the operation configured by the base station periodically may include a PDCCH monitoring operation, synchronization signal/physical broadcast channel (SS/PBCH) block reception and measurement operation, channel state information-reference signal (CSI-RS) reception and measurement operation, downlink semi-persistent schedul-ing (SPS) PDSCH reception operation, sounding reference signal (SRS) transmission operation, physical random access channel (PRACH) transmission operation, periodi-cally-configured PUCCH transmission operation, PUSCH transmission operation according to a configured grant, and the like. A flexible symbol may be overridden by a downlink symbol or an uplink symbol. When a flexible symbol is overridden by a downlink or uplink symbol, the terminal may perform a new operation instead of the existing opera-tion in the corresponding flexible symbol (e.g., overridden flexible symbol).

A slot format may be configured semi-statically by higher layer signaling (e.g., radio resource control (RRC) signal-ing). Information indicating a semi-static slot format may be included in system information, and the semi-static slot format may be configured in a cell-specific manner. In addition, a semi-static slot format may be additionally configured for each terminal through terminal-specific higher layer signaling (e.g., RRC signaling). A flexible symbol of a slot format configured cell-specifically may be overridden by a downlink symbol or an uplink symbol by terminal-specific higher layer signaling. In addition, a slot format may be dynamically indicated by physical layer signaling (e.g., slot format indicator (SFI) included in down-link control information (DCI)). The semi-statically config-ured slot format may be overridden by a dynamically indicated slot format. For example, a semi-static flexible symbol may be overridden by a downlink symbol or an uplink symbol by SFI.

The base station and the terminal may perform downlink operations, uplink operations, and sidelink operations in a bandwidth part. A bandwidth part may be defined as a set of consecutive RBs (e.g., physical resource blocks (PRBs)) having a specific numerology in the frequency domain. RBs constituting one bandwidth part may be consecutive in the frequency domain. One numerology may be used for trans-mission of signals (e.g., transmission of control channel or data channel) in one bandwidth part. In exemplary embodi-ments, when used in a broad sense, a 'signal' may refer to any physical signal and channel. A terminal performing an initial access procedure may obtain configuration informa-tion of an initial bandwidth part from the base station through system information. A terminal operating in an RRC connected state may obtain the configuration information of the bandwidth part from the base station through terminal-specific higher layer signaling.

The configuration information of the bandwidth part may include a numerology (e.g., a subcarrier spacing and a CP length) applied to the bandwidth part. Also, the configuration information of the bandwidth part may further include information indicating a position of a start RB (e.g., start PRB) of the bandwidth part and information indicating the number of RBs (e.g., PRBs) constituting the bandwidth part. At least one bandwidth part among the bandwidth part(s) configured in the terminal may be activated. For example, within one carrier, one uplink bandwidth part and one downlink bandwidth part may be activated respectively. In a time division duplex (TDD) based communication system, a pair of an uplink bandwidth part and a downlink bandwidth part may be activated. The base station may configure a plurality of bandwidth parts to the terminal within one carrier, and may switch the active bandwidth part of the terminal.

In exemplary embodiments, that a certain frequency band (e.g., carrier, bandwidth part, RB set, listen before talk (LBT) subband, guard band, etc.) is activated may mean a state in which the base station or terminal can transmit and receive signals by using the frequency band. In addition, that a certain frequency band is activated may mean that a radio frequency (RF) filter (e.g., band pass filter) of a transceiver operates including the frequency band.

In exemplary embodiments, an RB may mean a common RB (CRB). Alternatively, an RB may mean a PRB or a virtual RB (VRB). In the NR communication system, a CRB may refer to an RB constituting a set of consecutive RBs (e.g., common RB grid) based on a reference frequency (e.g., point A). Carriers, bandwidth part, and the like may be arranged on the common RB grid. That is, a carrier, bandwidth part, etc. may be composed of CRB(s). An RB or CRB constituting a bandwidth part may be referred to as a PRB, and a CRB index within the bandwidth part may be appropriately converted into a PRB index. In an exemplary embodiment, an RB may refer to an interlace RB (IRB).

A minimum resource unit constituting a PDCCH may be a resource element group (REG). An REG may be composed of one PRB (e.g., 12 subcarriers) in the frequency domain and one OFDM symbol in the time domain. Thus, one REG may include 12 resource elements (REs). A demodulation reference signal (DMRS) for demodulating a PDCCH may be mapped to 3 REs among 12 REs constituting the REG, and control information (e.g., modulated DCI) may be mapped to the remaining 9 REs.

One PDCCH candidate may be composed of one CCE or aggregated CCEs. One CCE may be composed of a plurality of REGs. The NR communication system may support CCE aggregation levels 1, 2, 4, 8, 16, and the like, and one CCE may consist of six REGs.

A control resource set (CORESET) may be a resource region in which the terminal performs a blind decoding on PDCCHs. The CORESET may be composed of a plurality of REGs. The CORESET may consist of one or more PRBs in the frequency domain and one or more symbols (e.g., OFDM symbols) in the time domain. The symbols constituting one CORESET may be consecutive in the time domain. The PRBs constituting one CORESET may be consecutive or non-consecutive in the frequency domain. One DCI (e.g., one DCI format or one PDCCH) may be transmitted within one CORESET. A plurality of CORESETs may be configured with respect to a cell and a terminal, and the plurality of CORESETs may overlap in time-frequency resources.

A CORESET may be configured in the terminal by a PBCH (e.g., system information transmitted through the PBCH). The identifier (ID) of the CORESET configured by the PBCH may be 0. That is, the CORESET configured by the PBCH may be referred to as a CORESET #0. A terminal operating in an RRC idle state may perform a monitoring operation in the CORESET #0 in order to receive a first PDCCH in the initial access procedure. Not only terminals operating in the RRC idle state but also terminals operating in the RRC connected state may perform monitoring operations in the CORESET #0. The CORESET may be configured in the terminal by other system information (e.g., system information block type 1 (SIB1)) other than the system information transmitted through the PBCH. For example, for reception of a random access response (or Msg2) in a random access procedure, the terminal may receive the SIB1 including the configuration information of the CORESET. Also, the CORESET may be configured in the terminal by terminal-specific higher layer signaling (e.g., RRC signaling).

In each downlink bandwidth part, one or more CORESETs may be configured for the terminal. The terminal may monitor PDCCH candidate(s) for a CORESET configured in a downlink active bandwidth part in the corresponding downlink active bandwidth part. Alternatively, the terminal may monitor PDCCH candidate(s) for a CORESET (e.g., CORESET #0) configured in a downlink bandwidth part other than a downlink active bandwidth part in the downlink active bandwidth part. The initial downlink active bandwidth part may include the CORESET #0 and may be associated with the CORESET #0. The CORESET #0 having a quasi-co-location (QCL) relation with an SS/PBCH block may be configured for the terminal in a primary cell (PCell), a secondary cell (SCell), and a primary secondary cell (PSCell). In the secondary cell (SCell), the CORESET #0 may not be configured for the terminal.

A search space may be a set of candidate resource regions through which PDCCHs can be transmitted. The terminal may perform a blind decoding on each of the PDCCH candidates within a predefined search space. The terminal may determine whether a PDCCH is transmitted to itself by performing a cyclic redundancy check (CRC) on a result of the blind decoding. When it is determined that a PDCCH is a PDCCH for the terminal itself, the terminal may receive the PDCCH. The terminal may periodically monitor a search space, and may monitor a search space at one or more time positions (e.g., PDCCH monitoring occasions, CORESETs) within one period.

A PDCCH candidate may be configured with CCEs selected by a predefined hash function within an occasion of the CORESET or the search space. The search space may be defined and configured for each CCE aggregation level. In this case, a set of search spaces for all CCE aggregation levels may be referred to as a 'search space set'. In exemplary embodiments, 'search space' may mean 'search space set', and 'search space set' may mean 'search space'.

A search space set may be logically associated with or corresponded to one CORESET. One CORESET may be logically associated with or corresponded to one or more search space sets. A common search space set configured through a PBCH may be used to monitor a DCI scheduling a PDSCH for transmitting an SIB 1. The ID of the common search space set configured through a PBCH may be set to 0. That is, the common search space set configured through a PBCH may be defined as a type 0 PDCCH common search space set or a search space set #0. The search space set #0 may be logically associated with the CORESET #0.

The search space set may be classified into a common search space set and a terminal-specific (i.e., UE-specific) search space set according to a purpose or a related operation. A common DCI may be transmitted in a common search space set, and a UE-specific DCI may be transmitted in a UE-specific search space set. Considering scheduling flexibility and/or fallback transmission, a UE-specific DCI may be transmitted also in a common search space set. For example, a common DCI may include resource allocation information of a PDSCH for transmission of system information, paging, a power control command, a slot format indicator (SFI), a preemption indicator, and/or the like. A UE-specific DCI may include resource allocation information of a PDSCH, resource allocation information of a PUSCH, and/or the like. A plurality of DCI formats may be defined according to a payload or size of DCI, a type of a radio network temporary identifier (RNTI), and/or the like.

In exemplary embodiments below, a common search space may be referred to as a CSS, and a common search space set may be referred to as a CSS set. In addition, in exemplary embodiments below, a UE-specific search space may be referred to as a USS, and a UE-specific search space set may be referred to as a USS set.

DRX Operations

It may cause unnecessary power consumption of a terminal if the terminal always monitors downlink control channels (e.g., PDCCHs) regardless of the presence or absence of traffic. Accordingly, the terminal may perform a discontinuous reception (DRX) operation. The terminal performing the DRX operation may be activated in a specific period to monitor PDCCHs, and may not perform a PDCCH monitoring operation in the remaining period. The specific period may be referred to as an active time, and a state in which the terminal operates in the corresponding period may be referred to as a DRX on state or the like. A time period other than the active time may be referred to as a DRX period, and a state in which the terminal operates in the corresponding period may be referred to as a DRX state, a DRX off state, a DRX mode, or the like.

The active time may include a time during which an on-duration timer is running, a time during which a DRX inactivity timer is running, and the like. The time during which the on-duration timer is running may be referred to as an 'on-duration' or the like. The on-duration timer may start at a starting time of each DRX cycle, and an expiration time of the timer may be an ending time of the on-duration. In addition, a starting time of the on-duration (or active time) may be indicated as a time when a predetermined offset elapses from the starting time of each DRX cycle. The terminal may monitor PDCCHs for a predetermined time period determined by the DRX inactivity timer from a time when a PDCCH is successfully received (e.g., a slot, sub-frame, or symbol in which the PDCCH is received). That is, the DRX inactivity timer may be started or reset at a time (e.g., a slot, subframe, or symbol) when the terminal successfully receives a PDCCH. The terminal may consider a time until the DRX inactivity timer expires as the active time, and monitor PDCCHs during the active time. The above-described timers may be decremented by 1 for every reference time (e.g., a slot, subframe, or symbol), and each of the timers may expire at a time (e.g., a slot, subframe, or symbol) when a value of the timer becomes 0.

When the above-described timer operations are combined, a terminal in a DRX off state may start a PDCCH monitoring operation by entering an on duration (or active time) at a starting time of a DRX cycle or a time after a predetermined offset elapses from the starting time of the DRX cycle. When the terminal successfully receives a PDCCH in an on-duration of a certain DRX cycle, a DRX inactivity timer of the terminal may be started, thereby extending the active time. On the other hand, when the terminal fails to receive or does not receive a PDCCH in the on-duration of the DRX cycle, the terminal may enter a DRX-off state again at an expiration time of the on-duration timer, that is, an ending time of the on-duration. In addition, the terminal may receive a medium access control (MAC) control element (CE) from a base station, and may be indicated to enter a DRX off state. In this case, the terminal may enter a DRX mode regardless of the timers in operation, and the on-duration timer and the DRX inactivity timer may be stopped.

The DRX operation may include a DRX operation according to a long DRX cycle (hereinafter, 'long DRX operation') and a DRX operation according to a short DRX cycle (hereinafter, 'short DRX operation'). Only one of the long DRX operation and the short DRX operation may be performed. Alternatively, the long DRX operation and the short DRX operation may be combined and performed. The above-described operation may be performed for each DRX cycle. The above-described operation may be applied to a terminal in an RRC connected mode. Alternatively, the above-described operation may also be applied to a terminal in an RRC idle mode or an RRC inactive mode.

Hereinafter, adaptive PDCCH monitoring for low-power operation of a terminal will be described. The proposed adaptive PDCCH monitoring method includes a PDCCH switching method and a PDCCH monitoring skipping method. In the following description, a search space set group (SSSG) may refer to a set of PDCCH search space set(s), a set of CORESET(s), a set of PDCCH monitoring occasion(s), and/or a set of PDCCH candidate(s).

PDCCH Switching Methods

A base station may dynamically change or switch SSSG(s) monitored by a terminal. For this, a plurality of SSSG(s) may be configured or defined in the terminal. For example, configuration information of each search space set may include number(s) or ID(s) of SSSG(s) to which the search space set belongs. Each search space set may be included in one SSSG or may be included in a plurality of SSSGs. Search space sets belonging to the same SSSG may be associated with the same CORESET or may be associated with different CORESETs.

Based on the configuration, the terminal may be indicated (or configured) by the base station to monitor specific SSSG(s). When the indicated SSSG(s) is different from the currently monitored SSSG(s), the terminal may perform SSSG switching and may perform a monitoring operation on the indicated SSSG(s). The terminal may maintain the current PDCCH monitoring operation when the indicated SSSG(s) is the same as the currently monitored SSSG(s). Hereinafter, 'PDCCH monitoring indication' may also be referred to as 'PDCCH switching indication', 'PDCCH change indication', 'SSSG monitoring indication', 'SSSG switching indication', 'SSSG change indication', and/or the like.

SSSG monitoring indication information may be included in a DCI and transmitted to a terminal or a terminal group. The SSSG monitoring indication information may include information on number(s) or ID(s) of SSSG(s), information indicating whether to perform SSSG switching (e.g., SSSG switching flag), and/or the like. For example, the SSSG monitoring indication information may be transmitted to a terminal or a terminal group through a group common DCI (e.g., DCI format 2_0, DCI format 2_6). For another example, the SSSG monitoring indication information may be transmitted to a terminal or a terminal group through a scheduling DCI (e.g., DCI formats 0_0, 1_0, 0_1, 1_1, 0_2, 1_2, . . . ).

According to an SSSG monitoring indication, a PDCCH monitoring operation of a terminal may be changed in units of slots (or mini-slots). Even if it is indicated to dynamically change SSSG(s), the terminal may perform a monitoring operation for the same SSSG(s) within one slot (or mini-slot). A time when each SSSG monitoring indication (or SSSG switching indication) is applied may be a certain slot, a starting time of a certain slot, a boundary between certain slots, and the like. The time when the SSSG monitoring indication is applied may be determined based on a time when the terminal obtain the SSSG monitoring indication. For example, a slot to which the terminal applies the SSSG monitoring indication may be the first slot appearing after a predetermined time period (e.g., M symbol(s)) elapses from the time when the terminal receives the SSSG monitoring indication (e.g., the last symbol in which the DCI including the SSSG monitoring indication is received). Here, M may be a natural number and may be predefined in a technical specification or signaled from the base station to the terminal.

The above-described SSSG switching scheme may be used for low-power operation of a terminal. For example, a first SSSG configured in the terminal may have a larger number of PDCCH candidates and/or a shorter PDCCH monitoring periodicity, and a second SSSG configured in the same terminal may include a smaller number of PDCCH candidates and/or a longer PDCCH monitoring periodicity. In this case, if an SSSG monitored by the terminal is switched from the first SSSG to the second SSSG, power consumption of the terminal may be reduced. On the other hand, when the SSSG monitored by the terminal is switched from the second SSSG to the first SSSG, power consumption of the terminal may increase. The base station may appropriately control a PDCCH set monitored by the terminal according to traffic conditions, and accordingly, the power consumption of the terminal may also be controlled.

Meanwhile, the SSSG switching operation may be performed together with the DRX operation.

Figure 3A:
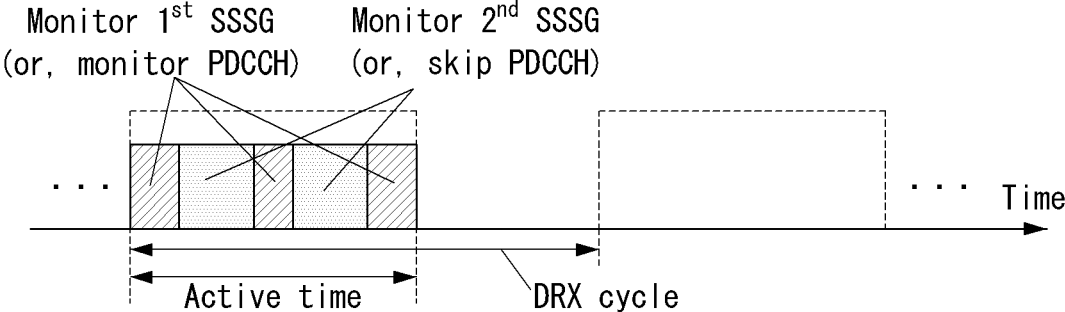
FIG. 3A is a conceptual diagram for describing an adaptive PDCCH monitoring method according to an exemplary embodiment of the present disclosure.

FIG. 3A is a conceptual diagram for describing an adaptive PDCCH monitoring method according to an exemplary embodiment of the present disclosure.

Referring to FIG. 3A, the terminal may perform a DRX operation and may perform PDCCH monitoring in an active time. The terminal may dynamically change a SSSG monitoring operation within the active time. For example, the terminal may perform an SSSG switching operation between the first SSSG and the second SSSG within the active time. For another example, the terminal may skip PDCCH monitoring in some periods of the active time. This may be implemented by a PDCCH monitoring skipping method to be described later. As a result, power consumption of the terminal may be further reduced.

Alternatively, the SSSG switching operation may be performed without the DRX operation.

Figure 3B:
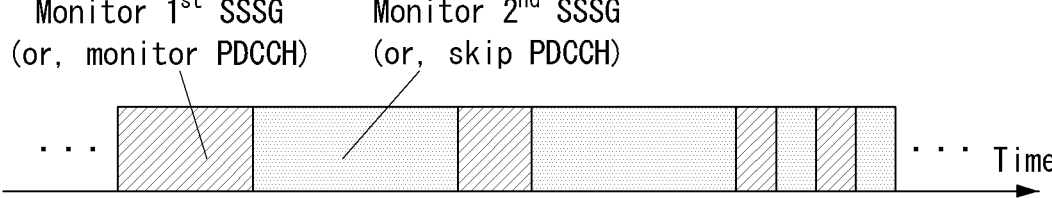
FIG. 3B is a conceptual diagram for describing an adaptive PDCCH monitoring method according to another exemplary embodiment of the present disclosure.

FIG. 3B is a conceptual diagram for describing an adaptive PDCCH monitoring method according to another exemplary embodiment of the present disclosure.

Referring to FIG. 3B, the terminal may perform an SSSG switching operation between the first SSSG and the second SSSG. Alternatively, the terminal may perform a PDCCH monitoring skipping operation for the first SSSG and/or the second SSSG. A period to which the SSSG switching, the PDCCH monitoring skipping, or the like is applied (e.g., low power mode period) may be appropriately allocated by the base station, and an operation corresponding to the DRX operation may be performed according to a configuration. At the same time, the terminal may perform operations such as radio resource monitoring (RRM) measurement, CSI measurement and reporting, and system information reception even in the period to which the SSSG switching, the PDCCH monitoring skipping, or the like is applied. This is different from the conventional DRX operation.

When the terminal performs both the SSSG switching operation and the DRX operation, the SSSG switching operation may be performed regardless of the DRX on/off state. As a result, an SSSG (hereinafter, 'starting SSSG' or 'default SSSG') that the terminal monitors in a starting period of a certain DRX cycle (e.g., slot(s) including the first slot in which the DRX cycle starts) may be the same as an SSSG that the terminal monitored last in the previous DRX cycle or an SSSG that the terminal was indicated last to monitor in the previous DRX cycle. According to the above scheme, since a starting SSSG of a certain DRX cycle is determined by a previously monitored SSSG (or an SSSG previously indicated to be monitored), it may be difficult for the base station to properly control a starting SSSG for each DRX cycle.

Accordingly, a method of associating the SSSG switching operation with the DRX on/off state may be considered. The SSSG monitoring or switching may be performed based on a specific DRX operation. That is, a specific DRX operation may trigger (or indicate) SSSG monitoring or switching. For example, a starting SSSG(s) (or default SSSG(s)) may be configured or indicated from the base station to the terminal.

The starting SSSG(s) may be configured to the terminal through an RRC signaling procedure. The starting SSSG(s) may be the same for all DRX cycles, or may be different for each DRX cycle. The terminal may start monitoring the starting SSSG(s) at the starting time of every DRX cycle (or after a predetermined time offset elapses from the starting time), that is, at a time of transition from the DRX off state to the DRX on state. Alternatively, the SSSG monitored by the terminal at the ending time of the active time, that is, when transitioning from the DRX on state to the DRX off state (or when a timer (e.g., SSSG switching timer) expires after that time), may be designated as (i.e., maintained as or changed to) the stating SSSG, and the starting SSSG may be maintained until a starting period of the next DRX cycle. In this case, the SSSG monitored by the terminal (or configured to the terminal) may be maintained even in a period outside the active time. When the previously monitored SSSG is different from the starting SSSG, the terminal may perform switching to the starting SSSG, and when the previously monitored SSSG is the same as the starting SSSG, the monitoring operation on the starting SSSG may be maintained.

The starting SSSG(s) may be indicated to the terminal through a DCI. For example, the starting SSSG(s) may be transmitted to a terminal or a terminal group through a group common DCI (e.g., DCI format 2_0, DCI format 2_6), a scheduling DCI (e.g., DCI format 0_0, 1_0, 0_1, 1_1, 0_2, 1_2, . . . ), or the like. The DCI (e.g., DCI format 2_6) including information indicating the starting SSSG(s) may be transmitted in a period outside the active time, and may be transmitted before a starting time of the next active time. In this case, the DCI (e.g., DCI format 2_6) may further include information on a wake-up of the terminal, that is, whether the terminal transitions to the DRX on state in the next DRX cycle and performs PDCCH monitoring. Alternatively, the DCI (e.g., DCI format 2_0, 2_6, 0_0, 1_0, 0_1, 1_1, 0_2, 1_2, . . . ) including the information indicating the starting SSSG(s) may be transmitted within the active time, and may further include information on a starting SSSG(s) for the next active time (or the active time of the next DRX cycle).

When the terminal is configured to monitor the DCI (e.g., DCI format 2_6) but the DCI is not received for a certain DRX cycle, or when the terminal is not configured to monitor the DCI (e.g., DCI format 2_6), the terminal may regard the SSSG(s) configured through the RRC signaling procedure, the SSSG(s) that the terminal monitored last in the previous DRX cycle, or the SSSG(s) that the terminal was indicated last to monitor in the previous DRX cycle as the starting SSSG(s) of the corresponding DRX cycle. Here, the case in which the DCI is not received may include a case in which the terminal fails to receive the DCI, a case in which a valid PDCCH monitoring occasion for receiving the DCI does not exist, and the like. Alternatively, when the terminal is configured to monitor the DCI (e.g., DCI format 2_6), but an interval between a starting time of a certain DRX period and a PDCCH monitoring occasion(s) of the DCI (e.g., DCI format 2_6) for the corresponding DRX period is equal to or less than a reference value, the terminal may regard the SSSG(s) configured through the RRC signaling procedure, the SSSG(s) that the terminal monitored last in the previous DRX cycle, or the SSSG(s) that the terminal was indicated last to monitor in the previous DRX cycle as the starting SSSG(s) of the corresponding DRX cycle. The reference value may be the minimum distance (e.g., symbol(s)) between a time when the DCI (e.g., DCI format 2_6) is received (e.g., the last symbol in which the DCI is received) and a time when the PDCCH switching is applied (e.g., the first symbol of a slot to which the PDCCH switching is applied). The reference value may be a time value corresponding to a time taken for the terminal to decode the PDCCH and obtain the DCI and a time taken for the terminal to perform the SSSG switching. Alternatively, the terminal may expect that the interval between the starting time of the certain DRX cycle and at least one PDCCH monitoring occasion of the DCI (e.g., DCI format 2_6) for the corresponding DRX cycle is equal to or greater than the reference value.

PDCCH Monitoring Skipping Methods

A base station may indicate a terminal to skip PDCCH monitoring. The terminal may receive information indicating to skip PDCCH monitoring (i.e., PDCCH monitoring skipping indication) through a DCI, and based thereon, may not perform a PDCCH monitoring operation in a certain period. The position of the certain period (i.e., a period in which the terminal skips PDCCH monitoring (hereinafter, 'PDCCH monitoring skipping period')) may be configured to the terminal through a separate signaling procedure (e.g., RRC signaling procedure) or may be indicated to the terminal by being included in the DCI. The configuration information or indication information of the PDCCH monitoring skipping period may include an ending time and/or a starting time of the PDCCH monitoring skipping period, a duration of the PDCCH monitoring skipping period, and the like. The PDCCH monitoring skipping period may be configured as one or more slot(s) (or symbol(s), subframe(s)).

A search space set(s), a CORESET(s), PDCCH monitoring occasion(s), PDCCH candidate(s), and/or the like to which the PDCCH monitoring indication (e.g., SSSG switching indication) or the PDCCH monitoring skipping indication is applied may be defined in a technical specification. For example, when indicated to skip PDCCH monitoring, the terminal may skip PDCCH monitoring on all search space set(s) (or all PDCCH candidate(s)) that it monitors. For another example, when indicated to skip PDCCH monitoring, the terminal may skip PDCCH monitoring on some of search space set(s) (or, CORESET(s), PDCCH monitoring occasion(s), PDCCH candidate(s)) that it monitors. To this end, the search space set(s) to which the PDCCH monitoring indication or the PDCCH monitoring skipping indication is not applied, the search space set(s) to which the PDCCH monitoring indication or the PDCCH monitoring skipping indication is applied may be defined in a technical specification. For example, the type 0, type 0A, type 1, type 2 PDCCH CSS set, and/or the like may be defined as the search space set(s) to which the PDCCH monitoring indication or PDCCH monitoring skipping indication is not applied. In addition, the type 3 PDCCH CSS set may be defined as the search space set to which the PDCCH monitoring indication or PDCCH monitoring skipping indication is not applied. For example, the CSS set may be monitored even in the PDCCH monitoring skipping period.

Alternatively, the terminal may be configured or indicated by the base station for the search space set(s) (or CORESET(s), PDCCH monitoring occasion(s), and PDCCH candidate(s)) to which the PDCCH monitoring skipping indication is applied. The set of the search space set(s) may correspond to the above-described SSSG. That is, when a specific SSSG is configured by the base station, the terminal may skip a PDCCH monitoring operation on the specific SSSG (e.g., specific search space set(s) (or, CORESET(s), PDCCH monitoring occasion(s), PDCCH candidate(s))). For example, the specific search space set(s) may be all search space set(s) to which the above-described PDCCH monitoring skipping indication can be applied. In other words, the specific search space set(s) may be the remaining search space set(s) excluding the search space set(s) to which the above-described PDCCH monitoring skipping indication is not applied. In this case, the search space set(s) included in the configured specific SSSG and the search space set(s) to which the terminal actually applies the monitoring skipping operation may not necessarily match.

Meanwhile, an SSSG (e.g., a null SSSG, an empty SSSG, a dormant SSSG, etc. (hereinafter referred to as a 'null SSSG')) that does not include any search space set may be defined or configured. The terminal may be configured with at most one null SSSG within one bandwidth part or one carrier. When the terminal is indicated to monitor the null SSSG, the terminal may not monitor any search space set (except for the search space set(s) to which the PDCCH monitoring indication or the PDCCH monitoring skipping indication is not applied). The null SSSG may not be used as the above-mentioned starting SSSG. That is, SSSG(s) excluding the null SSSG may be configured to the terminal as the starting SSSG(s). For example, the terminal may regard an SSSG having a specific ID as a null SSSG. For another example, when a specific SSSG is configured from the base station, the terminal may perform a PDCCH monitoring skipping operation on a search space set(s) included in the configured SSSG. That is, the search space set(s) included in the configured specific SSSG may match the search space set(s) to which the terminal actually applies the monitoring skipping operation. In this case, the terminal may perform a PDCCH monitoring operation on the search space set(s) not included in the configured SSSG.

The terminal may be configured with one SSSG for a PDCCH monitoring skipping operation. Alternatively, the terminal may be configured with a plurality of SSSGs for a PDCCH monitoring skipping operation.

Figure 4:
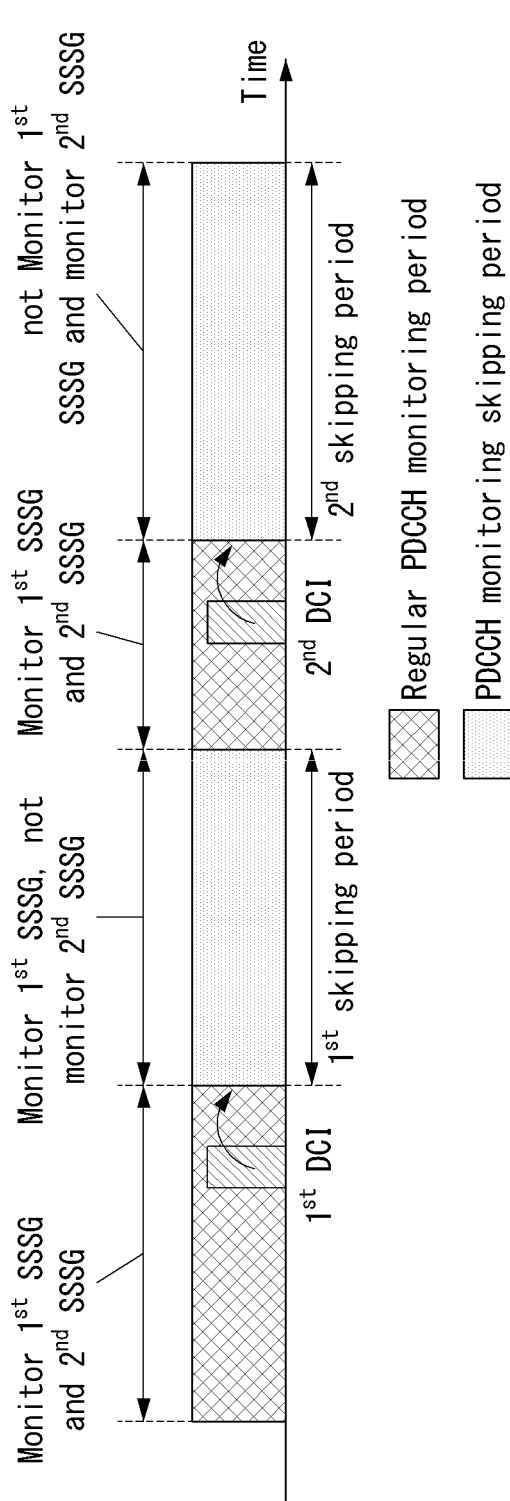
FIG. 4 is a conceptual diagram illustrating a PDCCH monitoring skipping method according to an exemplary embodiment of the present disclosure.

FIG. 4 is a conceptual diagram illustrating a PDCCH monitoring skipping method according to an exemplary embodiment of the present disclosure.

Referring to FIG. 4, the terminal may be configured, from the base station, with a plurality of SSSGs, that is, a first SSSG and a second SSSG. The base station may indicate the terminal to skip PDCCH monitoring on the first SSSG, the second SSSG, or both of the first SSSG and the second SSSG through a DCI. To this end, the DCI for indicating skipping of PDCCH monitoring may include information on ID(s) or number(s) of one or a plurality of SSSG(s).

Referring to FIG. 4, the terminal may be indicated to skip PDCCH monitoring on the second SSSG in a first skipping period based on reception of a first DCI. The terminal may perform PDCCH monitoring on the first SSSG in the first skipping period. In addition, the terminal may be indicated to skip PDCCH monitoring on the first SSSG and the second SSSG in a second skipping period based on reception of a second DCI. That is, a common PDCCH monitoring skipping period for a plurality of SSSGs may be indicated. The DCI for indicating the PDCCH monitoring skipping may include information on a common PDCCH monitoring skipping period for a plurality of SSSGs. Alternatively, the PDCCH monitoring skipping period may be indicated for the plurality of SSSGs, respectively. The terminal may perform monitoring on the first SSSG and a search space set(s) (or CORESET(s), PDCCH monitoring occasion(s), PDCCH candidate(s), and/or the like) that do not belong to the second SSSG in the first skipping period, and may perform monitoring on search space set(s) (or CORESET(s), PDCCH monitoring occasion(s), PDCCH candidate(s), and/or the like) that do not belong to both the first SSSG and the second SSSG in the second skipping period. According to another exemplary embodiment, the PDCCH monitoring skipping period may be semi-statically configured to the terminal through higher layer signaling (e.g., RRC signaling). Similarly in this case, the PDCCH monitoring skipping period may be configured in common for a plurality of SSSGs or may be configured individually for each SSSG. When the PDCCH monitoring skipping operation is applied only to a specific SSSG (e.g., null SSSG), the indication or configuration of the PDCCH monitoring skipping period or the SSSG monitoring period may be effective only for the specific SSSG.

The SSSG switching operation may be performed by a timer. For example, the terminal configured with the first SSSG and the second SSSG may initialize a timer and start the timer at a time when the first SSSG is switched to the second SSSG (e.g., a slot in which monitoring on the second SSSG starts). The timer value may decrease over time. For example, the timer value may decrease by 1 for every slot. The terminal may perform a switching operation to a pre-defined or configured SSSG (e.g., the first SSSG or default SSSG) at a time when the timer expires (e.g., a slot in which the timer value becomes 0 or a next slot of the slot), and may start a monitoring operation on the SSSG (e.g., the first SSSG or default SSSG). Alternatively, the SSSG monitored by the terminal after the timer expires may be indicated to the terminal through a DCI (e.g., DCI indicating SSSG monitoring or SSSS monitoring skipping). In addition, when terminal successfully receives a DCI (e.g., scheduling DCI) in a period in which the timer is running (e.g., the second SSSG monitoring period), the terminal may re-initialize the timer. Accordingly, the second SSSG monitoring period may be extended. The timer value may be set in units of slots. For example, the timer value may be set to T slots (T is a natural number or an integer greater than or equal to 0). The timer value may be set in common for a plurality of SSSGs. Alternatively, the timer value may be individually set for each SSSG. The terminal may be configured through signaling (e.g., RRC signaling, DCI) from the base station whether to perform the above-described timer extension or re-initialization operation in the SSSG monitoring period.

The PDCCH monitoring skipping period may be determined by the timer value. That is, the terminal may be indicated to perform a PDCCH monitoring skipping operation for a certain SSSG, and the PDCCH monitoring skipping operation for the SSSG may be performed while the timer for the SSSG is running (e.g., from a time when the timer is initialized to a time when the timer expires). For example, if the timer value is set to K slots for a certain SSSG (K is a natural number or an integer greater than or equal to 0), the PDCCH monitoring skipping operation for the corresponding SSSG may be performed for K consecutive slots. That is, the length of the PDCCH monitoring skipping period may be K consecutive slots. In this case, the timer may be extended or re-initialized by successful reception of a DCI. In this case, the PDCCH monitoring skipping period may be extended by the successful reception of the DCI. After the PDCCH monitoring skipping period, the terminal may perform an SSSG switching operation to a predefined or configured SSSG (e.g., default SSSG) or an SSSG monitored before the PDCCH monitoring skipping operation.

As described above, a PDCCH monitoring skipping operation may be performed only when a specific SSSG (e.g., null SSSG) is configured. Alternatively, a PDCCH monitoring skipping operation may be performed individually for each SSSG. For example, a period in which the terminal skips PDCCH monitoring (and a period in which the terminal performs PDCCH monitoring) may be independent for each SSSG (i.e., the period may be the same or different for each SSSG).

Figure 5:
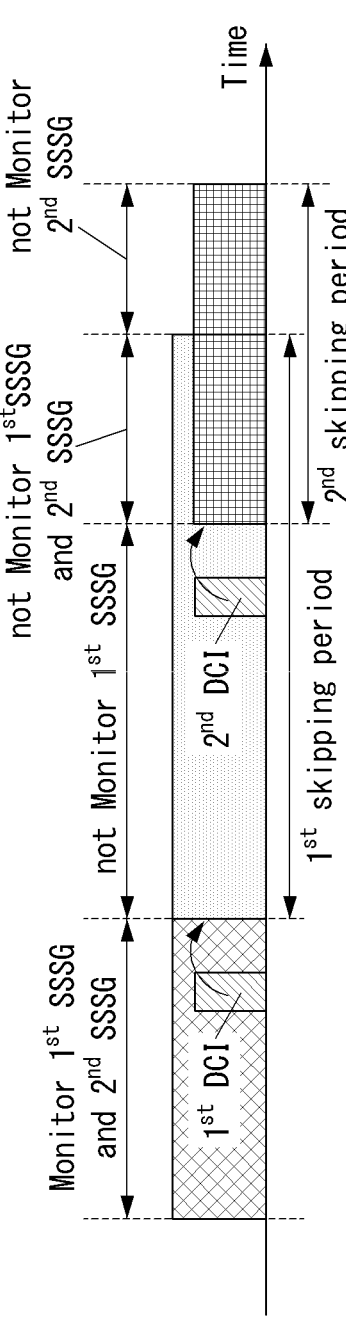
FIG. 5 is a conceptual diagram illustrating a PDCCH monitoring skipping method according to another exemplary embodiment of the present disclosure.

FIG. 5 is a conceptual diagram illustrating a PDCCH monitoring skipping method according to another exemplary embodiment of the present disclosure.

Referring to FIG. 5, the terminal may be configured, from the base station, with a plurality of SSSGs (i.e., the first SSSG and the second SSSG), and may be indicated to skip PDCCH monitoring on the first SSSG and/or the second SSSG through a DCI.

For example, the terminal may be indicated not to perform PDCCH monitoring on the first SSSG in a first skipping period based on reception of a first DCI. The terminal may perform PDCCH monitoring on the second SSSG in the first skipping period. In addition, the terminal may perform monitoring on a search space set(s) (or CORESET(s), PDCCH monitoring occasion(s), PDCCH candidate(s), and/or the like) that do not belong to the first SSSG and the second SSSG in the first skipping period. The terminal may be indicated not to perform PDCCH monitoring on the second SSSG in a second skipping period based on reception of a second DCI. The second DCI may be received in the first skipping period. For example, the second DCI may be transmitted through a search space set (or PDCCH) belonging to the second SSSG. According to the exemplary embodiment, the monitoring skipping period for the first SSSG may be different from the monitoring skipping period for the second SSSG. In addition, the monitoring skipping period for the first SSSG may (partially) overlap with the monitoring skipping period for the second SSSG. The terminal may skip the PDCCH monitoring operation on a union of the first SSSG and the second SSSG in a period in which the first skipping period and the second skipping period overlap.

Meanwhile, the PDCCH monitoring skipping operation may be performed together with the DRX operation. The terminal performing the PDCCH monitoring skipping operation may be configured or indicated by the base station for the starting SSSG(s) by the above-described method, and may perform PDCCH monitoring on the starting SSSG(s) in a starting period of each DRX cycle.

The base station may indicate the terminal to perform a PDCCH monitoring skipping operation without an indication of a PDCCH monitoring skipping period (or an ending time of the PDCCH monitoring skipping operation). That is, a DCI indicating skipping of PDCCH monitoring may not include information on a PDCCH monitoring skipping period (or an ending time of the PDCCH monitoring skipping operation). In this case, the terminal may continuously perform the PDCCH monitoring skipping operation until a separately defined or configured/indicated time (e.g., wake-up time) appears, and when the separately defined or configured/indicated time (e.g., wake-up time) appears, may stop the PDCCH monitoring skipping operation at that time. That is, at the corresponding time, the terminal may resume the PDCCH monitoring operation on the SSSG(s) monitored before the PDCCH monitoring skipping operation is indicated.

The wake-up time may be a specific slot, a starting time of a specific slot, a boundary between specific slots, or the like. The wake-up time may be predefined in a technical specification. The wake-up time may be semi-statically configured to the terminal. For example, the wake-up time may be configured to the terminal through an RRC signaling procedure. In this case, the wake-up time may appear periodically and repeatedly, and configuration information of the wake-up time may include a periodicity, a time offset (e.g., slot offset or symbol offset), and/or the like. Alternatively, the wake-up time may be dynamically indicated through a DCI. The DCI may be a DCI different from the DCI indicating the PDCCH monitoring skipping operation. The DCI may be a group common DCI (e.g., DCI formats 2_0, 2_6, etc.). Alternatively, the DCI may be a scheduling DCI (e.g., DCI formats 0_0, 1_0, 0_1, 1_1, 0_2, 1_2, etc.). Alternatively, the wake-up time may be expressed as a time distance (e.g., slot offset, duration) from a starting time of the PDCCH monitoring skipping operation. That is, when the terminal is not indicated a PDCCH monitoring skipping period through a DCI, the terminal may perform the PDCCH monitoring skipping operation for a duration configured separately (e.g., configured through RRC signaling).

Combining PDCCH Switching and PDCCH Monitoring Skipping

The PDCCH switching operation and the PDCCH monitoring skipping operation may be configured together. For example, a PDCCH switching operation (i.e., operation of performing PDCCH monitoring) may be applied to a certain period, and a PDCCH monitoring skipping operation may be applied to another period. In addition, a PDCCH switching operation (i.e., operation of performing PDCCH monitoring) may be applied to certain SSSG(s), and a PDCCH monitoring skipping operation may be applied to some other SSSG(s). In this case, the SSSG to which the PDCCH switching operation (i.e., operation of performing PDCCH monitoring) is applied and the SSSG to which the PDCCH monitoring skipping operation is applied may be different from each other. The adaptive PDCCH monitoring operation (i.e., PDCCH switching operation and/or PDCCH monitoring skipping operation) applied to each SSSG may be semi-statically configured. Alternatively, the SSSG to which the PDCCH switching operation (i.e., operation of performing PDCCH monitoring) is applied and the SSSG to which the PDCCH monitoring skipping operation is applied may not be different from each other. Both the PDCCH switching operation and the PDCCH monitoring skipping operation may be applied to the same SSSG (e.g., at different time points).

Figure 6:
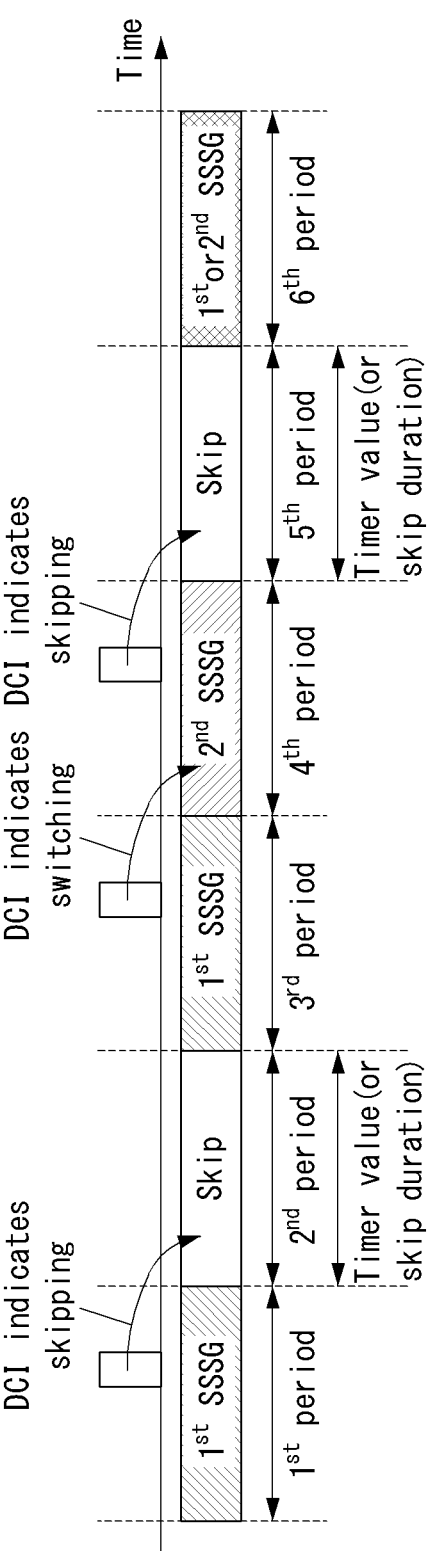
FIG. 6 is a conceptual diagram illustrating a method of simultaneously performing PDCCH switching and PDCCH monitoring skipping according to an exemplary embodiment of the present disclosure.

FIG. 6 is a conceptual diagram illustrating a method of simultaneously performing PDCCH switching and PDCCH monitoring skipping according to an exemplary embodiment of the present disclosure.

Referring to FIG. 6, the terminal may monitor two SSSGs (i.e., the first SSSG and the second SSSG) based on the configuration from the base station. In this case, the terminal may be indicated either of the PDCCH monitoring skipping operation and the PDCCH switching operation through a DCI by the above-described method. For example, the terminal may skip PDCCH monitoring in a second period based on a DCI received in a first period. In addition, the terminal may switch from the first SSSG to the second SSSG based on a DCI received in a third period, and monitor the second SSSG in a fourth period. In addition, the terminal may skip PDCCH monitoring in a fifth period based on a DCI received in the fourth period. In this case, the length of the PDCCH monitoring skipping period of the terminal (i.e., the second period or the fifth period) may be determined by a timer operation. For example, the terminal may start a timer at a time of entering the PDCCH monitoring skipping period, and may perform the PDCCH monitoring skipping operation until the timer expires (e.g., a slot in which the timer expires). The timer value may be set to an absolute time (e.g., A ms) or the number of slots (e.g., B slot(s)), and may be decremented by 1 every unit time (e.g., 1 ms) or every slot. When the timer value becomes 0, the timer may expire. Alternatively, the length of the PDCCH monitoring skipping period may be configured or indicated by the base station to the terminal.

When SSSG switching and PDCCH monitoring skipping are performed together as in the above exemplary embodiment, the SSSG monitoring operation of the terminal in a period (e.g., the third period or the sixth period) after the PDCCH monitoring skipping period ends may be defined. Meanwhile, a default SSSG may be configured to the terminal for the timer-based SSSG switching operation. The terminal may switch to the default SSSG when the timer expires while monitoring the certain SSSG. In the above exemplary embodiment, the first SSSG may be the default SSSG. The SSSG monitored by the terminal in the period immediately after the PDCCH monitoring skipping period may be determined by the SSSG monitored in the period immediately before the PDCCH monitoring skipping period. For example, the terminal may perform the PDCCH skipping operation in the second period, and when monitoring the first SSSG, which is the default SSSG, in the first period immediately before the second period, the terminal may monitor the first SSSG monitored in the first period in the third period immediately after the second period. For another example, the terminal may perform the PDCCH skipping operation in the fifth period, and may monitor the second SSSG instead of the default SSSG in the fourth period immediately before the fifth period. In this case, a plurality of methods for the terminal to determine the SSSG to be monitored in the sixth period, which is a period immediately after the fifth period, may be considered.

As a first method, when the terminal enters the PDCCH monitoring skipping period (i.e., the fifth period), the timer for the SSSG (i.e., the second SSSG) monitored in the previous period may be terminated or expired. The terminal may monitor the default SSSG (i.e., the first SSSG) in the period (i.e., the sixth period) after the PDCCH monitoring skipping period (i.e., the fifth period).

As a second method, the terminal may pause the timer for the SSSG (i.e., the second SSSG) monitored in the previous period when entering the PDCCH monitoring skipping period (i.e., the fifth period). The timer may be stopped during the PDCCH monitoring skipping period (i.e., the fifth period). The terminal may resume the timer at the time when the PDCCH monitoring skipping period (i.e., the fifth period) ends, and in the period (i.e., the sixth period) after the PDCCH monitoring skipping period, may resume the monitoring operation on the previous SSSG (i.e., the second SSSG) in the period (e.g., the sixth period) after the PDCCH monitoring skipping period.

As a third method, the terminal may continue to count the timer for the SSSG (i.e., the second SSSG) monitored in the previous period during the PDCCH monitoring skipping period (i.e., the fifth period). The terminal may monitor the default SSSG (i.e., the first SSSG) in the period (i.e., the sixth period) after the PDCCH monitoring skipping period when the timer expires until the PDCCH monitoring skipping period (i.e., the fifth period) ends. On the other hand, if the timer does not expire when the PDCCH monitoring skipping period (i.e., the fifth period) ends, the terminal may resume the monitoring operation on the previous SSSG (i.e., the second period) in the period (i.e., the sixth period) after the PDCCH monitoring skipping period.

The above-described methods may be applied regardless of the SSSG monitored by the terminal in the period immediately before the PDCCH monitoring skipping operation. For example, the above-described methods may be equally applied even when the terminal monitors the default SSSG in the period immediately before the PDCCH monitoring skipping period.

The above-described PDCCH monitoring indication and PDCCH monitoring skipping indication may be performed by the same DCI format (or the same DCI, a specific field of the same DCI format, etc.). For example, a specific field (e.g., PDCCH monitoring adaptation indication field) of the DCI format may indicate one of a plurality of codepoints. In this case, the PDCCH monitoring operation or the PDCCH switching operation may be indicated through a portion of the plurality of codepoints, and the PDCCH monitoring skipping operation may be indicated through another portion of the plurality of codepoints. For example, the field may be configured with two bits, a code point '00' may be used to indicate the PDCCH monitoring skipping, and at least some of code points '01', '10', and '11' may be used to indicate the PDCCH monitoring operation or PDCCH switching operation. The same DCI format may be a DCI format transmitted through a PDCCH including a cyclic redundancy check (CRC) scrambled by the same RNTI. The same DCI format may be a DCI format transmitted through the same search space set. The same DCI format may be one of the aforementioned DCI formats (e.g., DCI formats 2_0, 2_6, 0_0, 1_0, 0_1, 1_1, 0_2, 1_2, etc.).

When the DCI format indicating the PDCCH monitoring adaptation operation is a downlink or uplink scheduling DCI (e.g., DCI formats 0_0, 1_0_1, 1_1, 0_2, 1_2, etc.), the DCI format may schedule a data channel (e.g., PDSCH, PUSCH). When the DCI format is a downlink scheduling DCI and the data channel is a PDSCH, the terminal may feedback a HARQ-ACK for the PDSCH to the base station. The base station may identify whether the terminal has applied the PDCCH monitoring adaptation operation through reception of the HARQ-ACK.

Alternatively, even when the DCI format indicating the PDCCH monitoring adaptation operation is a downlink or uplink scheduling DCI (e.g., DCI formats 0_0, 1_0_1, 1_1, 0_2, 1_2, etc.), the DCI format may not schedule a data channel (e.g., PDSCH, PUSCH). Alternatively, when the DCI format indicating the PDCCH monitoring adaptation operation is not a scheduling DCI (e.g., DCI formats 2_0, 2_6, etc.), the DCI format may not schedule a data channel (e.g., PDSCH, PUSCH). In this case, the terminal may feedback a HARQ-ACK for reception of the DCI to the base station even though there is no PDSCH scheduled by the DCI. A time when the HARQ-ACK is transmitted may be preconfigured to the terminal or may be indicated by the DCI, and the time when the HARQ-ACK is transmitted (e.g., a slot in which the HARQ-ACK is transmitted) may be determined based on a time when the DCI is received (e.g., a slot in which the DCI is received). Whether to transmit the HARQ-ACK may be determined according to a type of a HARQ-ACK codebook configured to the terminal or generated by the terminal. For example, when the terminal performs a HARQ-ACK feedback operation based on a specific type of HARQ-ACK codebook (e.g., type 2 HARQ-ACK codebook), the HARQ-ACK for the DCI may be reported to the base station.

The base station may use the same DCI format to selectively signal, to the terminal, information indicating to monitor a PDCCH monitoring resource set (e.g., SSSG(s)) or information indicating to skip monitoring on a PDCCH monitoring resource set (e.g., SSSG(s)). Alternatively, the base station may use one DCI to signal, to the terminal, the information indicating to monitor a PDCCH monitoring resource set (e.g., SSSG(s)) together with the information indicating to skip monitoring on a PDCCH monitoring resource set (e.g., SSSG(s)). The DCI (or DCI format) may include information on one or a plurality of SSSG(s) (e.g., ID(s) or number(s) of the SSSG(s)). In addition, the DCI may include information on whether the terminal is to monitor the SSSG(s) or skip monitoring thereon. The information may be represented by one bit (e.g., a flag of one bit).

Additionally or alternatively, the DCI (or DCI format) may include information on a PDCCH monitoring skipping period (e.g., duration). The information on the PDCCH monitoring skipping period (e.g., duration) may have a value expressed by the number N of slot(s) (N is a natural number or an integer greater than or equal to 0). Here, the slot (i.e., slot duration) may be a slot (i.e., slot duration) of a downlink bandwidth part (BWP) activated in a cell in which the terminal performs the PDCCH monitoring operation. Alternatively, the slot (i.e., slot duration) may be a slot (i.e., slot duration) of one bandwidth part determined by a predefined rule among downlink bandwidth part(s) configured in the cell in which the terminal performs the PDCCH monitoring operation. The one bandwidth part may be a bandwidth part having the smallest (or largest) subcarrier spacing among the configured downlink bandwidth part(s). Alternatively, the information on the PDCCH monitoring skipping period (e.g., duration) may be expressed as an absolute time value (e.g., K ms). Alternatively, as described above, the information on the PDCCH monitoring skipping period may include information on a timer for the SSSG switching operation (e.g., timer value).

In addition, information indicating that the terminal continuously performs the PDCCH monitoring skipping operation until a time (e.g., wake-up time) that is separately defined or configured/indicated for the corresponding SSSG(s) appears may be included in the information on the PDCCH monitoring skipping period (e.g., duration). For example, the information may be expressed by representing the value of N as 'infinity' or 'maximum'. In addition, the information indicating the terminal to perform the PDCCH monitoring for the corresponding SSSG(s) may be included in the information on the PDCCH monitoring skipping period (e.g., duration). For example, the information may be expressed by representing the value of N as 0, 'none', or the like.

The DCI for indicating the above-described adaptive PDCCH monitoring operation may be transmitted through a USS set. For example, the adaptive PDCCH monitoring operation may be indicated through a non-fallback DCI (e.g., DCI formats 0_1, 1_1, 0_2, 1_2, . . . ). Alternatively, the adaptive PDCCH monitoring operation may be indicated through a fallback DCI (e.g., DCI formats 0_0, 1_0). Accordingly, the terminal may be configured so that each SSSG includes at least one USS set. When a null SSSG is configured to the terminal, the terminal may be configured so that each SSSG excluding the null SSSG includes at least one USS set. Alternatively, when the adaptive PDCCH monitoring method is applied, the base station may config- ure or indicate the terminal to monitor at least one USS set in the entire period (e.g., in each SSSG monitoring period). In particular, the terminal may be configured or indicated to monitor at least one USS set even in a period for which PDCCH monitoring skipping is indicated. For example, the search space set(s) to which the PDCCH monitoring skip- ping operation is not applied may include at least one USS set. In addition, the DCI for indicating the above-described adaptive PDCCH monitoring operation may be transmitted through a type 3 CSS set. Accordingly, the terminal may be configured such that each SSSG includes at least one USS set or at least one type 3 CSS set. In particular, the terminal may be configured or indicated to monitor at least one type 3 CSS set even in a period for which PDCCH monitoring skipping is indicated. For example, the search space set(s) to which the PDCCH monitoring skipping operation is not applied may include at least one type 3 CSS set. According to the above-described method, the terminal may receive a DCI for indicating the PDCCH monitoring operation at all times (e.g., in all the SSSG monitoring periods) regardless of the SSSG it monitors.

A certain DCI format (e.g., DCI format 2_6) may serve as a wake-up signal. For example, the terminal may determine whether to perform PDCCH monitoring by transitioning to a DRX on state in a next DRX cycle based on indication information of the DCI format 2_6. In this case, the above- described adaptive PDCCH monitoring operation may not be applied to monitoring of the DCI format 2_6. For example, a search space set (e.g., type 3 CSS set) for monitoring the DCI format 2_6 may not be included in any SSSG. Alternatively, the search space set (e.g., type 3 CSS set) for monitoring the DCI format 2_6 may be included in all SSSG(s), and monitoring on the DCI format 2_6 may be always performed regardless of the SSSG(s) monitored by the terminal. Alternatively, the search space set (e.g., type 3 CSS set) for monitoring on the DCI format 2_6 may be included in all SSSG(s) excluding the null SSSG, and the monitoring on the DCI format 2_6 may be always performed in the remaining period(s) excluding the null SSSG moni- toring period regardless of the SSSG(s) that the terminal is configured or indicated to monitor. The monitoring opera- tion on the SSSG may only be effective in slots within the active time. That is, the adaptive PDCCH monitoring opera- tion may not be applied in a period outside the active time.

In some cases, a transmission reliability of the DCI for indicating the adaptive PDCCH monitoring operation, that is, a reception performance thereof may not be sufficiently high. For example, the terminal may fail to receive the DCI. In this case, the terminal may perform a monitoring opera- tion on a PDCCH monitoring resource different from that intended by the base station, and the DCI intended by the base station to be transmitted to the terminal may not be normally transmitted from the base station to the terminal. In this case, communication between the base station and the terminal may fall into a disabled state.

As a method for solving the above problem, the terminal may perform the above-described adaptive PDCCH moni- toring operation only when a specific condition is satisfied. For example, the base station may schedule a PDSCH while indicating the adaptive PDCCH monitoring operation through a downlink scheduling DCI (e.g., DCI formats 1_0, 1_1, 1_2, . . . ). In this case, if the terminal successfully receives the PDSCH scheduled through the DCI, the termi- nal may perform an operation according to the PDCCH monitoring adaptation indication by the same DCI. Since the terminal successfully receives the PDSCH, HARQ-ACK information for the PDSCH may indicate ACK, and the terminal may transmit the ACK to the base station. On the other hand, if the terminal does not successfully receive the PDSCH scheduled through the DCI, the terminal may not perform an operation according to the PDCCH monitoring adaptation indication by the same DCI, and may transmit a NACK as the HARQ-ACK information for the PDSCH to the base station. Accordingly, the base station may know whether the terminal performs the operation according to the PDCCH monitoring adaptation indication based on the HARQ-ACK information received from the terminal. That is, if the base station receives the ACK for the PDSCH from the terminal, the base station may assume that the terminal performs the PDCCH monitoring adaptation operation indi- cated by the DCI, and may transmit subsequent PDCCHs in the corresponding search space set(s) (e.g., the switched search space set(s)). On the other hand, if the base station receives the NACK for the PDSCH or does not receive the HARQ-ACK information for the PDSCH from the terminal, the base station may assume that the terminal does not perform the PDCCH monitoring adaptation operation indi- cated by the DCI, and may transmit subsequent PDCCHs in the corresponding search space set(s) (e.g., the previous search space set(s)). Accordingly, a possibility that the PDCCH monitoring sets between the base station and the terminal are inconsistent may be reduced. This method may be referred to as (Method 100).

In (Method 100), a time when the PDCCH monitoring adaptation operation indicated by the DCI is applied may be after a predetermined reference time elapses from a time when the PDSCH is received (e.g., PDSCH reception completion time, the last symbol in which the PDSCH is received). Alternatively, the terminal may be indicated to apply the PDCCH monitoring adaptation operation after a predetermined reference time elapses from the PDSCH reception time (e.g., PDSCH reception completion time, the last symbol in which the PDSCH is received). For example, the time when the PDCCH monitoring adaptation operation indicated by the DCI is applied may be the first slot after a predetermined reference time elapses from the completion time of the PDSCH reception. The predetermined reference time may correspond to a time including a time required for the terminal to decode the PDSCH. Alternatively, the predetermined reference time may correspond to a time including a time required for the terminal to decode the PDSCH and a time required for the terminal to prepare for transmission of a HARQ-ACK corresponding thereto. The predetermined reference time may be defined as U symbol(s) and/or V slot(s) (U and V are natural numbers). The predetermined reference time may be predefined in a technical specification. The predetermined reference time may be defined to be the same or different for each carrier or bandwidth part on which the PDCCH monitoring operation is performed. The predetermined reference time may be defined as the capability of the terminal, and the terminal may transmit capability information regarding the predetermined reference time supported by the terminal to the base station.

On the other hand, the application time of the PDCCH monitoring adaptation operation indicated by the DCI may be allowed to precede the time when the terminal determines ACK or NACK for the PDSCH. In this case, the terminal may wait until the decoding of the PDSCH is completed, that is, until the ACK/NACK for the PDSCH is determined, and may apply the PDCCH monitoring adaptation operation (e.g., in the first slot appearing thereafter). Alternatively, if the application time of the PDCCH monitoring adaptation operation is earlier than the time of determining the ACK/NACK of the PDSCH (i.e., when the base station performs the switching indicated by itself at the indicated time before receiving the NACK for the first DCI or determining that the HARQ-ACK is not received, and transmits a second DCI according to the switched SSSG), the base station may apply the PDCCH monitoring adaptation operation at the corresponding application time. In addition, if the reception of the PDSCH fails and the NACK is determined, the terminal may perform the previous PDCCH monitoring operation without applying the indicated PDCCH monitoring adaption operation from after the time when the NACK is determined (i.e., from the first slot appearing after the ACK/NACK is determined). That is, the indicated PDCCH monitoring adaptation operation may be canceled.

On the other hand, even if (Method 100) is used, it may be difficult for the base station to identify whether the terminal has performed the operation indicated by the PDCCH monitoring adaptation indication before receiving the HARQ-ACK information transmitted by the terminal or before determining that the HARQ-ACK information is not received from the terminal. That is, there may still be ambiguity as to whether the terminal has performed the PDCCH monitoring adaptation operation. Hereinafter, problems and solutions that may occur due to this will be described.

The HARQ-ACK for the PDSCH may be included in a type 1 HARQ-ACK codebook and transmitted to the base station. The payload size of the type 1 HARQ-ACK codebook, that is, the number of HARQ-ACK bit(s), may be determined based on the number of PDSCH candidate(s) (or, PDCCH candidate(s) indicating release of semi-persistent scheduling (SPS) PDSCH) for which HARQ-ACK bit(s) corresponding thereto are likely to be transmitted at a given HARQ-ACK transmission time, and each HARQ-ACK bit may indicate ACK or NACK information according to a reception result of each PDSCH candidate. When the terminal does not actually receive a scheduling DCI corresponding to a certain PDSCH candidate, a HARQ-ACK bit for the corresponding PDSCH candidate may indicate NACK information.

Figure 7:
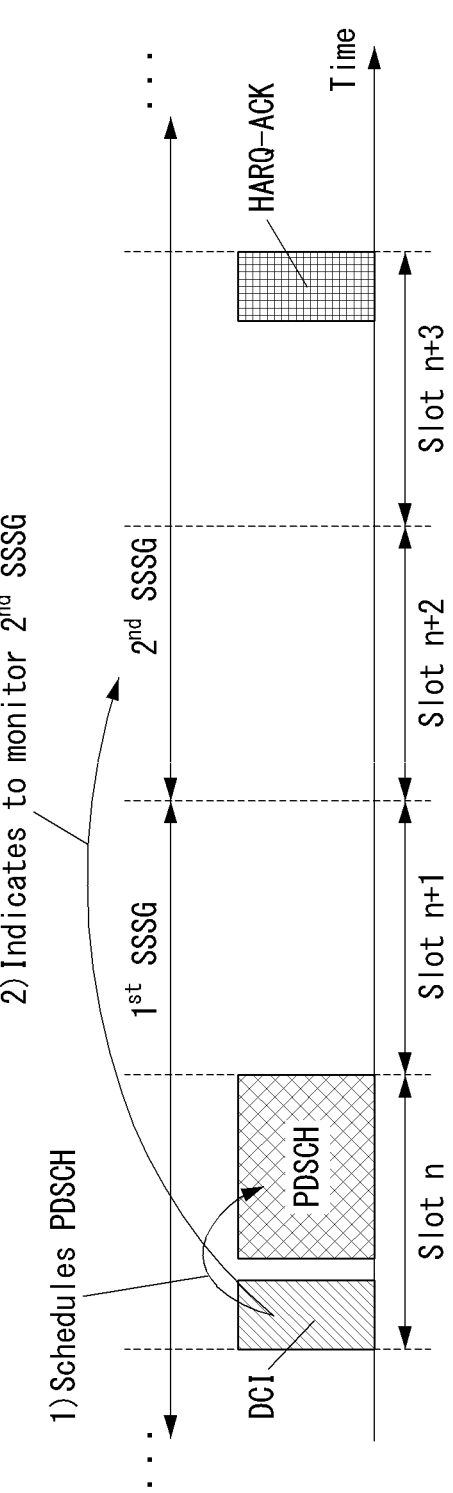
FIG. 7 is a conceptual diagram illustrating a method for indicating an adaptive PDCCH monitoring by a downlink DCI according to an exemplary embodiment of the present disclosure.

FIG. 7 is a conceptual diagram illustrating a method for indicating an adaptive PDCCH monitoring by a downlink DCI according to an exemplary embodiment of the present disclosure.

Referring to FIG. 7, the terminal may receive a DCI (e.g., downlink DCI) in a slot n to receive a scheduled PDSCH. The terminal may be indicated to monitor the second SSSG from a slot (n+2) by the same DCI. Also, the terminal may be indicated (via the DCI) to transmit a HARQ-ACK for the PDSCH in a slot (n+3). The terminal may report the HARQ-ACK to the base station using a type 1 HARQ-ACK codebook. In this case, the size of the type 1 HARQ-ACK codebook transmitted in the slot (n+3) may be changed by PDCCH switching from the first SSSG to the second SSSG. That is, the size of the type 1 HARQ-ACK codebook when the indication of the PDCCH switching to the second SSSG is applied and the size of the type 1 HARQ-ACK codebook when the indication of the PDCCH switching to the second SSSG is not applied may be different from each other. According to the above method, the base station may need to receive the HARQ-ACK in the slot (n+3) to identify whether the terminal has followed the indication, whereas the payload size of the HARQ-ACK in the slot (n+3) may be determined by whether the terminal has followed the indication. The base station may fail to receive the HARQ-ACK, and the above-described ambiguity problem may occur.

As a method for solving the above-described problems, the terminal may expect that the size of the HARQ-ACK codebook (e.g., type 1 HARQ-ACK codebook), the order in which the HARQ-ACKs for the respective PDSCH candidates are mapped to the payload of the HARQ-ACK codebook (e.g., type 1 HARQ-ACK codebook), and the like are not changed according to the adaptive PDCCH monitoring operation. For example, in the exemplary embodiment of FIG. 5, the size of the type 1 HARQ-ACK codebook when the indication of the PDCCH switching to the second SSSG is applied may be the same as the size of the type 1 HARQ-ACK when the indication of the PDCCH switching to the second SSSG is not applied. The above method may be limitedly applied to the HARQ-ACK codebook in which the HARQ-ACK for the PDSCH scheduled by the DCI indicating the PDCCH switching is transmitted. That is, regardless of whether the DCI indicating the PDCCH switching is successfully received by the terminal, the size of the codebook including the HARQ-ACK for the PDSCH scheduled by the DCI may be maintained to be the same regardless of whether the PDCCH switching is applied. Alternatively, when the adaptive PDCCH monitoring operation is performed, the size of the HARQ-ACK codebook (e.g., type 1 HARQ-ACK codebook) may follow a predefined or configured value. As another method, a method of delaying the application time of the PDCCH monitoring adaptation operation may be used. This will be described in more detail below.

On the other hand, the HARQ-ACK corresponding to the PDSCH may not be transmitted. For example, an uplink physical channel (e.g., PUCCH, PUSCH) on which the HARQ-ACK corresponding to the PDSCH may not be transmitted according to a transmission priority, slot format configuration, lack of processing time, incorrect indication of the base station for a HARQ-ACK transmission resource or transmission timing, or the like. In this case, a problem may arise that a PDCCH monitoring set of the terminal assumed by the base station and a PDCCH monitoring set assumed by the terminal do not match.

Accordingly, when the terminal successfully receives the PDSCH scheduled through the DCI and transmits the corresponding HARQ-ACK to the base station, the terminal may perform an operation according to the PDCCH monitoring adaptation indication by the DCI. If the terminal does not successfully receive the PDSCH or does not transmit the corresponding HARQ-ACK to the base station, the terminal may not perform the operation according to the indication. In this case, the application time of the PDCCH monitoring adaptation operation indicated by the DCI may be after the transmission time of the HARQ-ACK (e.g., the transmission completion time of the HARQ-ACK, the last symbol in which a PUCCH or PUSCH including the HARQ-ACK is transmitted). For example, the application time of the PDCCH monitoring adaptation indication may be the first slot after the transmission time of the HARQ-ACK (e.g., the completion time of the HARQ-ACK transmission, the last symbol in which a PUCCH or PUSCH including the HARQ-ACK is transmitted). Alternatively, the terminal may be indicated to perform the PDCCH monitoring adaptation operation after the transmission time of the HARQ-ACK (e.g., the completion time of the HARQ-ACK transmission, the last symbol in which a PUCCH or PUSCH including the HARQ-ACK is transmitted). This may be referred to as (Method 110).

Figure 8:
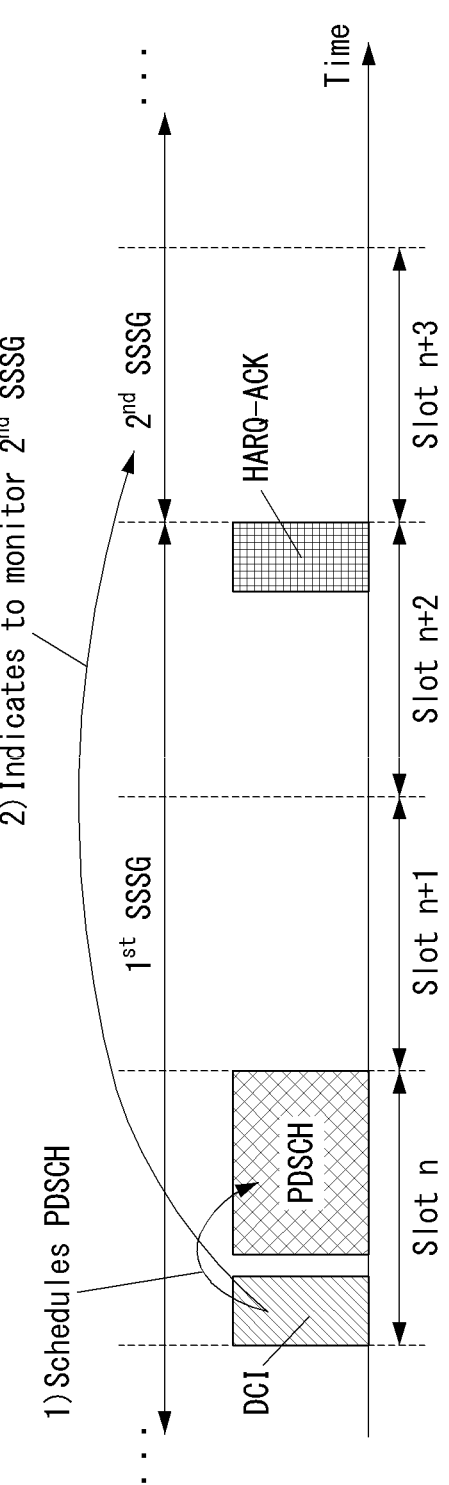
FIG. 8 is a conceptual diagram illustrating a method for indicating an adaptive PDCCH monitoring by a downlink DCI according to another exemplary embodiment of the present disclosure.

FIG. 8 is a conceptual diagram illustrating a method for indicating an adaptive PDCCH monitoring by a downlink DCI according to another exemplary embodiment of the present disclosure.

Referring to FIG. 8, the terminal may receive a DCI (e.g., downlink DCI) in a slot n to receive a scheduled PDSCH, and may be indicated by the same DCI to monitor the second SSSG (or, not to monitor the second SSSG). In addition, the terminal may be indicated (via the DCI) to transmit a HARQ-ACK for the PDSCH in a slot (n+2). In this case, the terminal may be indicated to apply the PDCCH monitoring switching operation to the second SSSG by (Method 110) after the slot (n+2) that is the HARQ-ACK transmission time. Referring to FIG. 6, the operation of PDCCH monitoring switching to the second SSSG may be applied from a slot (n+3).

It may take a certain time for the base station to decode the HARQ-ACK received from the terminal. For example, in the exemplary embodiment of FIG. 6, it may be assumed that one slot (i.e., one slot duration) is required for the base station to decode the HARQ-ACK received in the slot (n+2). According to the above assumption, the base station may not know whether the terminal has performed the PDCCH monitoring adaptation operation in the slot (n+3). If the terminal is indicated to perform PDSCH rate matching for a certain CORESET, the PDSCH rate matching operations for the CORESET assumed by the base station and the terminal in the slot (n+3) may be different from each other. As a result, the PDSCH reception performance of the terminal in the slot (n+3) may be deteriorated.

In order to solve the above-described problem, the application time of the PDCCH monitoring adaptation indication may be a time after a reference time elapses (e.g., the first slot after the reference time elapses) from the HARQ-ACK transmission completion time of the terminal (e.g., the last symbol in which a PUCCH or PUSCH including the HARQ-ACK is transmitted). Alternatively, the terminal may be indicated or configured to perform the PDCCH monitoring adaptation operation after the reference time elapses from the time when the transmission of the HARQ-ACK is completed. The reference time may correspond to a time including a time required for the base station to decode the HARQ-ACK or an uplink physical channel (e.g., PUCCH, PUSCH) including the HARQ-ACK. The reference time may be defined as X symbol(s) and/or Y slot(s) (X and Y are natural numbers). The reference time may be predefined in a technical specification. The reference time may be defined to be the same or differently for each carrier or bandwidth part on which the PDCCH monitoring operation is performed. This method may be referred to as (Method 111).

In (Method 110) and (Method 111), when the terminal is indicated to perform the PDCCH monitoring adaptation operation before the above-described time point, the terminal may ignore the indication. Alternatively, when the terminal is indicated to perform the PDCCH monitoring adaptation operation before the above-mentioned time point, the terminal may wait until the above-mentioned time point and then apply the PDCCH monitoring adaptation operation at a time after the above-mentioned time point (e.g., the first slot after the above-mentioned time point).

As another method, when the terminal successfully receives the PDSCH scheduled through the DCI and it is determined that the corresponding HARQ-ACK is to be transmitted to the base station, the terminal may perform the PDCCH monitoring adaptation operation according to the indication of the DCI. On the other hand, when the terminal does not successfully receive the PDSCH or it is determined that the corresponding HARQ-ACK is not to be transmitted to the base station, the terminal may not perform the PDCCH monitoring adaptation operation according to the indication of the DCI. In this case, the time when the HARQ-ACK is determined to be transmitted to the base station may be determined based on a transmission time of an uplink physical channel (e.g., PUCCH or PUSCH) including the HARQ-ACK and a predetermined reference time corresponding a time (i.e., preparation time) required for preparing for the corresponding transmission. For example, the time when the terminal can determine that the HARQ-ACK is to be transmitted to the base station may be at latest a time earlier by the predetermined reference time corresponding to the preparation time than the transmission starting time of the uplink control channel (e.g., PUCCH or PUSCH) on which the HARQ-ACK is transmitted. At the same time, the time when the terminal can determine that the HARQ-ACK is to be transmitted to the base station may be a time later by a predetermined reference time corresponding to a time required for decoding the PDSCH than the reception completion time of the PDSCH (e.g., an ending time of the last symbol of the PDSCH). This may be referred to as (Method 120).

In (Method 120), the application time of the PDCCH monitoring adaptation operation indicated by the DCI may be after the time when whether to transmit the HARQ-ACK is finally determined. For example, the application time of the PDCCH monitoring adaptation indication may be the first slot after the time when whether to transmit the HARQ-ACK is finally determined, the first slot after a reference time elapses from the time when whether to transmit the HARQ-ACK is finally determined, or the like. Alternatively, the terminal may be indicated to perform the PDCCH monitoring adaptation operation after the time when whether to transmit the HARQ-ACK is finally determined. The terminal may not transmit the HARQ-ACK to the base station according to a reason such as a collision with other uplink transmission, a transmission priority, a transmission power, and/or the like. When the terminal does not transmit the HARQ-ACK to the base station, the terminal may not perform the operation according to the PDCCH monitoring adaptation indication. In addition, when a HARQ-ACK transmission resource and/or HARQ-ACK transmission timing indicated by the DCI is invalid, the terminal may not perform an operation according to the PDCCH monitoring adaptation indication by the DCI.

A plurality of PDSCHs may be scheduled by a downlink DCI. The plurality of PDSCHs may be repeated transmissions for the same TB. Alternatively, the plurality of PDSCHs may be transmissions for different TBs. In this case, the above-described methods may be implemented with some changes. For example, when a plurality of PDSCHs or a plurality of TBs are scheduled by a downlink DCI, the terminal may follow an adaptive PDCCH monitoring indication by the DCI only when at least one PDSCH or at least one TB is determined as acknowledged (ACKed). In this case, the application time of the indicated PDCCH monitoring adaptation operation may precede the reception completion time of the last PDSCH. For another example, when a plurality of PDSCHs or a plurality of TBs are scheduled by a downlink DCI, the terminal may follow an adaptive PDCCH monitoring indication by the DCI only when at least one PDSCH or at least one TB is determined as acknowledged (ACKed) and the ACK is transmitted to the base station. For another example, when a plurality of PDSCHs or a plurality of TBs are scheduled by a downlink DCI, the terminal may follow an adaptive PDCCH monitoring indication by the DCI only when at least one PDSCH or at least one TB is determined as ACKed and the ACK is determined to be transmitted to the base station.

When the downlink DCI does not schedule a PDSCH, whether or not the adaptive PDCCH monitoring operation indicated by the DCI is performed and the application time of the adaptive PDCCH monitoring operation may be determined by an uplink transmission triggered by the DCI (e.g., whether the uplink transmission is performed, a transmission time of the uplink transmission, etc.). For example, when the downlink DCI triggers an aperiodic CSI report, the terminal may perform the PDCCH monitoring adaptation operation indicated by the DCI only when the aperiodic CSI report is transmitted to the base station. Alternatively, similarly to the case of HARQ-ACK described above, when the downlink DCI triggers an aperiodic CSI report, the terminal may perform the PDCCH monitoring adaptation operation indicated by the DCI only when the aperiodic CSI report is determined to be transmitted to the base station. The application time of the PDCCH monitoring adaptation operation may be determined by a transmission time of an uplink physical channel (e.g., PUCCH or PUSCH) including the aperiodic CSI report and a reference time corresponding to a preparation time of the corresponding transmission.

When the indication of the adaptive PDCCH monitoring operation is by an uplink DCI (e.g., DCI format 0_0, 0_1, 0_2, . . . ), the terminal may perform the PDCCH monitoring adaptation operation indicated by the DCI only when a PUSCH scheduled by the DCI is transmitted to the base station. In this case, the application time of the PDCCH monitoring adaptation indication may be after a transmission completion time of the PUSCH (e.g., the last symbol of the PUSCH). Alternatively, the terminal may perform the PDCCH monitoring adaptation operation indicated by the DCI only when the PUSCH scheduled by the DCI is determined to be transmitted to the base station. A time when the terminal determines whether to actually transmit the PUSCH may be determined by the transmission time of the PUSCH and a reference time corresponding to a preparation time of the corresponding transmission. For example, the time when the terminal determines whether to actually transmit the PUSCH may be (at the latest) a time earlier by a reference time corresponding to the preparation time than a transmission starting time of the PUSCH (e.g., a starting time of the first symbol of the PUSCH).

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

The invention claimed is:

1. An operation method of a terminal, comprising:
receiving, from a base station, configuration information of a first search space set group (SSSG) and a second SSSG, each of the first SSSG and the second SSSG including one or more search space sets;
receiving, from the base station, indication information indicating an operation of performing physical downlink control channel (PDCCH) monitoring on the first SSSG, an operation of performing PDCCH monitoring on the second SSSG, or an operation of skipping PDCCH monitoring; and
performing, on a serving cell, the operation of performing PDCCH monitoring on the first SSSG, the operation of performing PDCCH monitoring on the second SSSG, or the operation of skipping PDCCH monitoring for a first duration, based on the indication information,
wherein the indication information is dynamically received through downlink control information (DCI),
wherein the operation of performing PDCCH monitoring on the second SSSG is performed until a timer expires, and the terminal monitors a specific SSSG after the timer expires, and
wherein when the timer expires, the terminal monitors the specific SSSG after a duration in which the terminal performs another operation of skipping PDCCH monitoring.

2. The operation method according to claim 1, wherein the indication information is delivered to the terminal by a specific field of the DCI indicating one of a plurality of codepoints, the operation of performing PDCCH monitoring on the first SSSG is indicated when the specific field indicates a first codepoint among the plurality of codepoints, the operation of performing PDCCH monitoring on the second SSSG is indicated when the specific field indicates a second codepoint among the plurality of codepoints, and the operation of skipping PDCCH monitoring for the first duration is indicated when the specific field indicates a third codepoint among the plurality of codepoints.

3. The operation method according to claim 1, wherein the DCI further includes scheduling information of a data channel, and the terminal receives, from the base station, the data channel based on the scheduling information.

4. The operation method according to claim 1, further comprising transmitting hybrid automatic repeat request (HARQ) acknowledgement (ACK) information to the base station in response to reception of the DCI, wherein the HARQ ACK information is a reception response to a data channel or a reception response to the DCI depending on whether the DCI includes scheduling information of the data channel.

5. The operation method according to claim 1, further comprising transmitting HARQ ACK information to the base station in response to reception of the DCI, wherein a transmission time of the HARQ ACK information is determined to be a time after a predetermined time from a time at which the indication information is applied.

6. The operation method according to claim 1, wherein the first duration consists of one or more slots of an active downlink bandwidth part of the serving cell and is indicated to the terminal as being included in the indication information.

7. The operation method according to claim 1, wherein a value of the timer corresponds to one or more slots and is commonly applied to multiple SSSGs, and the specific SSSG is the first SSSG.

8. The operation method according to claim 1, wherein when the second SSSG does not include monitoring occasion(s), the terminal does not perform PDDCH monitoring on the second SSSG.

9. The operation method according to claim 1, further comprising, when the indication information indicates the operation of skipping PDCCH monitoring, performing PDCCH monitoring on predefined search space set(s) for the first duration, wherein the predefined search space set(s) does not include a type 3 PDCCH common search space set.

10. The operation method according to claim 1, wherein the terminal performs discontinuous reception (DRX) operation based on DRX configuration information received from the base station, and the terminal performs PDCCH monitoring on one of the first SSSG and the second SSSG that is preconfigured from the base station in a starting part of an on-duration of a DRX cycle.

11. An operation method of a base station, comprising:

transmitting, to a terminal, configuration information of a first search space set group (SSSG) and a second SSSG, each of the first SSSG and the second SSSG including one or more search space sets; and transmitting, to the terminal, indication information indicating an operation of performing physical downlink control channel (PDCCH) monitoring on the first SSSG, an operation of performing PDCCH monitoring on the second SSSG, or an operation of skipping PDCCH monitoring for a first duration, wherein the indication information is dynamically transmitted to the terminal through downlink control information (DCI), wherein when the indication information indicates the operation of performing PDCCH monitoring on the second SSSG, the indication information allows the terminal to perform the operation of performing PDCCH monitoring on the second SSSG until a timer expires, and to perform an operation of performing PDCCH monitoring on a specific SSSG after the timer expires, and when the timer expires, the indication information allows the terminal to perform the operation of performing PDCCH monitoring on the specific SSSG after a duration in which the terminals performs another operation of skipping PDCCH monitoring.

12. The operation method according to claim 11, wherein the indication information is delivered to the terminal by a specific field of the DCI indicating one of a plurality of codepoints, the operation of performing PDCCH monitoring on the first SSSG is indicated when the specific field indicates a first codepoint among the plurality of codepoints, the operation of performing PDCCH monitoring on the second SSSG is indicated when the specific field indicates a second codepoint among the plurality of codepoints, and the operation of skipping PDCCH monitoring for the first duration is indicated when the specific field indicates a third codepoint among the plurality of codepoints.

13. The operation method according to claim 11, wherein a value of the timer corresponds to one or more slots and is commonly applied to multiple SSSGs, and the specific SSSG is the first SSSG.

14. The operation method according to claim 11, further comprising receiving hybrid automatic repeat request (HARQ) acknowledgement (ACK) information from the terminal in response to the DCI, wherein the HARQ ACK information is a reception response to a data channel or a reception response to the DCI depending on whether the DCI includes scheduling information of the data channel.

15. The operation method according to claim 11, further comprising receiving HARQ ACK information from the terminal in response to the DCI, wherein a reception time of the HARQ ACK information is determined to be a time after a predetermined time from a time at which the indication information is applied.

16. The operation method according to claim 11, wherein the first duration consists of one or more slots of an active downlink bandwidth part of the serving cell and is indicated to the terminal as being included in the indication information.

17. A terminal comprising:

a processor; and a transceiver controlled by the processor, wherein the processor is configured to perform:

receiving, from a base station and by using the transceiver, configuration information of a first search space set group (SSSG) and a second SSSG, each of the first SSSG and the second SSSG including one or more search space sets;

receiving, from the base station and by using the transceiver, indication information indicating an operation of performing physical downlink control channel (PDCCH) monitoring on the first SSSG, an operation of performing PDCCH monitoring on the second SSSG, or an operation of skipping PDCCH monitoring; and performing, by using the transceiver and on a serving cell, the operation of performing PDCCH monitoring on the first SSSG, the operation of performing PDCCH monitoring on the second SSSG, or the operation of skipping PDCCH monitoring for a first duration, based on the indication information, wherein the indication information is dynamically received through downlink control information (DCI), wherein the operation of performing PDCCH monitoring on the second SSSG is performed until a timer expires, and the terminal monitors a specific SSSG after the timer expires, and wherein when the timer expires, the terminal monitors the specific SSSG after a duration in which the terminal performs another operation of skipping PDCCH monitoring.

18. The terminal according to claim 17, wherein the indication information is delivered to the terminal by a specific field of the DCI indicating one of a plurality of codepoints, the operation of performing PDCCH monitoring on the first SSSG is indicated when the specific field indicates a first codepoint among the plurality of codepoints, the operation of performing PDCCH monitoring on the second SSSG is indicated when the specific field indicates a second codepoint among the plurality of codepoints, and the operation of skipping PDCCH monitoring for the first duration is indicated when the specific field indicates a third codepoint among the plurality of codepoints.

19. The terminal according to claim 17, wherein the first duration consists of one or more slots of an active downlink bandwidth part of the serving cell and is indicated to the terminal as being included in the indication information.

\* \* \* \* \*